(12) United States Patent
Tsuboi et al.

(10) Patent No.: US 10,015,706 B2
(45) Date of Patent: Jul. 3, 2018

(54) RADIO COMMUNICATION SYSTEM, TERMINAL DEVICE, BASE STATION DEVICE, RADIO COMMUNICATION METHOD, AND INTEGRATED CIRCUIT

(71) Applicant: SHARP KABUSHIKI KAISHA, Osaka-shi, Osaka (JP)

(72) Inventors: Hidekazu Tsuboi, Osaka (JP); Katsunari Uemura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 30 days.

(21) Appl. No.: 14/763,083

(22) PCT Filed: Jan. 21, 2014

(86) PCT No.: PCT/JP2014/051143
§ 371 (c)(1),
(2) Date: Jul. 23, 2015

(87) PCT Pub. No.: WO2014/115734
PCT Pub. Date: Jul. 31, 2014

(65) Prior Publication Data
US 2015/0373598 A1 Dec. 24, 2015

(30) Foreign Application Priority Data
Jan. 28, 2013 (JP) .................................. 2013-012735

(51) Int. Cl.
*H04W 4/00* (2018.01)
*H04W 36/00* (2009.01)
(Continued)

(52) U.S. Cl.
CPC ....... *H04W 36/0094* (2013.01); *H04W 16/32* (2013.01); *H04W 48/16* (2013.01); *H04W 84/045* (2013.01)

(58) Field of Classification Search
CPC . H04W 24/10; H04W 36/0083; H04W 16/14; H04W 48/08; H04W 52/146;
(Continued)

(56) References Cited

U.S. PATENT DOCUMENTS 9,094,996 B2 * 7/2015 Tian ...................... H04L 1/1822
9,204,316 B2 * 12/2015 Suzuki .................. H04W 24/02
(Continued)

FOREIGN PATENT DOCUMENTS

JP 2010-531577 A 9/2010
WO WO 2008/157573 A1 12/2008

OTHER PUBLICATIONS

International Search Report, issued in PCT/JP2014/051143, dated Apr. 15, 2014.
R2-120523, Nokia Siemens Networks, Nokia Corporation, "Enhancements for Small Cell Detection", 3GPP TSG-RAN WG2 Meeting #77, Dresden, Germany, Feb. 6-10, 2012.
(Continued)

*Primary Examiner* — Edan Orgad
*Assistant Examiner* — Vanneilian Lalchinthang
(74) *Attorney, Agent, or Firm* — Birch, Stewart, Kolasch & Birch, LLP

(57) ABSTRACT

A measurement object of which a terminal device takes a measurement is selected based on information of whether or not the measurement object included in a measurement configuration message notified by a base station device includes a parameter for a gap configuration or for a cell identification time configuration for small-cell measurement, and receiving power of a cell in which the terminal device itself is present.

4 Claims, 14 Drawing Sheets

(51) Int. Cl.
*H04W 16/32* (2009.01)
*H04W 48/16* (2009.01)
*H04W 84/04* (2009.01)

(58) Field of Classification Search
CPC ............... H04W 88/10; H04W 52/247; H04W 72/1268; H04L 1/00; Y02B 60/50
See application file for complete search history.

(56) References Cited

U.S. PATENT DOCUMENTS

| | | | |
|---|---|---|---|
| 2010/0159950 A1* | 6/2010 | Toh ...................... | H04J 11/0086 455/456.1 |
| 2010/0208604 A1 | 8/2010 | Kazmi et al. | |
| 2011/0103243 A1* | 5/2011 | Larsson .................. | H04L 5/001 370/252 |
| 2012/0157085 A1* | 6/2012 | Iwamura ............... | H04W 24/10 455/422.1 |
| 2012/0263064 A1* | 10/2012 | Iwamura ........... | H04W 36/0083 370/252 |
| 2013/0182655 A1* | 7/2013 | Das ....................... | H04W 24/10 370/329 |
| 2014/0087715 A1* | 3/2014 | Suzuki .................. | H04W 24/10 455/422.1 |

OTHER PUBLICATIONS

R2-130451, Nokia Siemens Networks, Nokia Corporation, "Background interfrequency measurement for small cell discovery", 3GPP TSG-RAN WG2 Meeting #81, Malta, Jan. 28-Feb. 1, 2013.
Technical Report, "3rd Generation Partnership Project; Technical Specification Group Radio Access Network; Evolved Universal Terrestrial Radio Access (E-UTRA); Mobility enhancements in heterogeneous networks", (Release 11), 3GPP TR 36.839, V11.1.0, (Dec. 2012).
Technical Specification, "3rd Generation Partnership Project; Technical Specification Group Radio Access Network; Evolved Universal Terrestrial Radio Access (E-UTRA); Radio Resource Control (RRC); Protocol specification", (Release 11), 3GPP TS 36.331, V11.2.0, (Dec. 2012).
Written Opinion of the International Searching Authority, issued in PCT/JP2014/051143, dated Apr. 15, 2014.
Marvell, "Regarding Measurements During CPC Downlink DRX Operation," 3GPP TSG-RAN Working Group 4 (Radio) meeting #44, R4-071242, Athens, Greece, Aug. 20-24, 2007 (Aug. 16, 2007), 3 pages, XP050177703.
Qualcomm Europe, "Introduction of UE Measurement Capability for DC-HSDPA," 3GPP TSG-RAN WG4 Meeting #48bis, R4-082297, Edinburgh, United Kingdom, Sep. 29-Oct. 3, 2008 (Sep. 26, 2008), 5 pages, XP050325583.

* cited by examiner

RADIO COMMUNICATION SYSTEM, TERMINAL DEVICE, BASE STATION DEVICE, RADIO COMMUNICATION METHOD, AND INTEGRATED CIRCUIT

TECHNICAL FIELD

The present invention relates to a radio communication system, a terminal device, a base station device, a radio communication method, and an integrated circuit, and more specifically relates to a radio communication system in which a small cell is arranged at a frequency different from that of a macro cell, a terminal device, a base station device, a radio communication method and an integrated circuit in the aforementioned radio communication system.

The present application claims priority based on Japanese Patent Application No. 2013-012735 filed in Japan on Jan. 28, 2013, the content of which is incorporated herein by reference.

BACKGROUND ART

In 3GPP (3rd Generation Partnership Project), a W-CDMA scheme has been standardized as a third-generation cellular mobile communication scheme, and service has been sequentially started. HSDPA with higher communication speed has also been standardized and service has been carried out.

On the other hand, in the 3GPP, evolution of third generation radio access (Evolved Universal Terrestrial Radio Access; hereinafter referred to as "EUTRA") has also been standardized, and service has been started. As a downlink communication scheme of the EUTRA, an OFDM (Orthogonal Frequency Division Multiplexing) scheme which is resistant to multipath interference and suitable for high-speed transmission has been employed. Moreover, a DFT (Discrete Fourier Transform)-spread OFDM scheme of single carrier frequency division multiple scheme SC-FDMA (Single Carrier-Frequency Division Multiple Access) capable of reducing a peak to average power ratio PAPR of a transmitted signal has been employed as an uplink communication scheme in consideration of cost and power consumption of a terminal device.

Further, in the 3GPP, working for standardizing Advanced-EUTRA, which is a further evolution from the EUTRA, is being carried out. It is assumed in the Advanced-EUTRA to use a band of up to 100-MHz bandwidth in each of uplink and downlink to perform communications with transmission rates of up to 1 Gbps or more in the downlink and 500 Mbps or more in the uplink.

In the Advanced-EUTRA, Heterogeneous Network (hereinafter, referred to as HetNet) is being considered in order to efficiently support communication traffic which is generated locally. The HetNet is a hierarchical network in which, in addition to a conventional macro cell, a small cell such as a pico cell or a femto cell is arranged so as to have a cell area overlapped with that of the macro cell (at a same frequency or a different frequency), which allows dispersion of communication traffic by mobile communication of a terminal device near the small cell which is present in the macro cell to the aforementioned small cell. Therefore, a mechanism by which a small cell is able to be detected efficiently by a terminal device which is present in a macro cell is being considered in the 3GPP (NPL 1).

CITATION LIST

Non-Patent Document

NPL 1: 3GPP TR (Technical Report) 36.839, V11.1.0, Evolved Universal Terrestrial Radio Access (E-UTRA); Mobility enhancements in heterogeneous networks NPL 2: R2-130451, Nokia Siemens Networks, Nokia Corporation, "Background inter-frequency measurement for small cell discovery", 3GPP TSG-RAN WG2#81, Malta, 28 Jan.-1 Feb. 2013

NPL 3: 3GPP TS (Technical Specification) 36.331, V11.2.0, Evolved Universal Terrestrial Radio Access (E-UTRA); Radio Resource Control (RRC); Protocol specification

DISCLOSURE OF THE INVENTION

Problems to be Solved by the Invention

A mechanism for searching for a cell of a different frequency to take measurement exists under present conditions, which is a mechanism optimized for searching for a cell of a handover destination by a terminal device when quality of a serving cell becomes worse (in a gap period configured by a base station device). Therefore, when a cell of a different frequency is searched for at all times in a state where quality of the serving cell is not bad, power of the terminal device is consumed significantly. NPL 2 proposes to introduce a new configuration value for detecting a small cell to a measurement gap configuration (MeasGapConfig) which is used for conventional measurement, but when a parameter for detecting a small cell is applied, there is influence on handover characteristic when quality of the serving cell becomes worse as described above.

The present invention has been made in view of the aforementioned point, and on object thereof is to provide a radio communication system, a terminal device, a base station device, a radio communication method and an integrated circuit capable of searching for a cell of a different frequency efficiently.

Means for Solving the Problems (1) In order to achieve the aforementioned object, the present invention takes the following means. That is, a radio communication system in an embodiment of the present invention is a radio communication system in which a base station device and a terminal device perform communication, in which the base station device includes means for notifying the terminal device of a measurement configuration message that includes a measurement object indicating information such as a frequency to be measured, a configuration indicating a first gap period during which communication with the terminal device is not performed temporarily, and a parameter for configuring a second gap period to the measurement object, and the terminal device includes means for, in a case where the parameter for configuring the second gap period is included in a measurement object of a different frequency notified from the base station device, configuring the second gap period based on the first gap period and carrying out measurement of the different frequency in the second gap period.

(2) Moreover, a radio communication system in an embodiment of the present invention is a radio communication system in which a base station device and a terminal device perform communication, in which the base station device includes means for notifying the terminal device of a measurement configuration message that includes a measurement object indicating information such as a frequency to be measured, and the terminal device includes means for, in a case where a parameter for a cell identification time configuration is not included in the measurement object notified from the base station device, applying a given cell identification time configuration to measurement of the measurement object, and in a case where the parameter for the cell identification time configuration is included in the measurement object, applying the cell identification time configuration based on the parameter for the cell identification time configuration, and means for performing estimation of a mobility state of an own device, and in a case where a result of the estimation is higher speed than a given state or in a case where receiving power of a serving cell in which the own device is present is less than a threshold notified from the base station device, not carrying out measurement of the measurement object in which the parameter for the cell identification time configuration is included.

(3) Moreover, a terminal device in an embodiment of the present invention is a terminal device that communicates with a base station device, in which the terminal device includes means for receiving, from the base station device, a measurement configuration message that includes a measurement object indicating information such as a frequency to be measured, a configuration indicating a first gap period during which communication with the terminal device is not performed temporarily, and a parameter for configuring a second gap period to the measurement object, and means for, in a case where the parameter for configuring the second gap period is included in a measurement object of a different frequency notified from the base station device, configuring the second gap period based on the first gap period.

(4) Moreover, in the terminal device in the embodiment of the present invention, the terminal device performs estimation of a mobility state of an own device, and in a case where a result of the estimation is higher speed than a given state or in a case where receiving power of a serving cell in which the own device is present is less than a threshold notified from the base station device, does not carry out measurement of the different frequency in the second gap period.

(5) Moreover, a terminal device in an embodiment of the present invention is a terminal device that communicates with a base station device, in which the terminal device includes means for receiving, from the base station device, a measurement configuration message that includes a measurement object indicating information such as a frequency to be measured, and in a case where a parameter for a cell identification time configuration is not included in the measurement object notified from the base station device, applying a given cell identification time configuration to measurement of the measurement object, and in a case where the parameter for the cell identification time configuration is included in the measurement object, applying the cell identification time configuration based on the parameter for the cell identification time configuration.

(6) Moreover, in the terminal device in the embodiment of the present invention, the terminal device performs estimation of a mobility state of an own device, and in a case where a result of the estimation is higher speed than a given state or in a case where receiving power of a serving cell in which the own device is present is less than a threshold notified from the base station device, does not carry out measurement of the measurement object in which the parameter for the cell identification time configuration is included.

(7) Moreover, a base station device in an embodiment of the present invention is a base station device that communicates with a terminal device, in which the base station device includes means for notifying the terminal device of a measurement configuration message that includes a measurement object indicating information such as a frequency to be measured, a configuration indicating a first gap period during which communication with the terminal device is not performed temporarily, and a parameter for configuring a second gap period which is configured by a part of the first gap period to the measurement object.

(8) Moreover, a radio communication method in an embodiment of the present invention is a radio communication method applied to a radio communication system in which a base station device and a terminal device perform communication, including a step in which the base station device notifies the terminal device of a measurement configuration message that includes a measurement object indicating information such as a frequency to be measured, a configuration indicating a first gap period during which communication with the terminal device is not performed temporarily, and a parameter for configuring a second gap period to the measurement object, and a step in which the terminal device, in a case where the parameter for configuring the second gap period is included in a measurement object of a different frequency notified from the base station device, configures the second gap period based on the first gap period and carries out measurement of the different frequency in the second gap period.

(9) Moreover, a radio communication method in an embodiment of the present invention is a radio communication method applied to a radio communication system in which a base station device and a terminal device perform communication, in which the base station device includes means for notifying the terminal device of a measurement configuration message that includes a measurement object indicating information such as a frequency to be measured, and the method comprising a step in which the terminal device, in a case where a parameter for a cell identification time configuration is not included in the measurement object notified from the base station device, applies a given cell identification time configuration to measurement of the measurement object, and in a case where the parameter for the cell identification time configuration is included in the measurement object, applies the cell identification time configuration based on the parameter for the cell identification time configuration, and a step in which the terminal device further performs estimation of a mobility state of an own device, and in a case where a result of the estimation is higher speed than a given state or in a case where receiving power of a serving cell in which the own device is present is less than a threshold notified from the base station device, does not carry out measurement of the measurement object in which the parameter for the cell identification time configuration is included.

(10) Moreover, an integrated circuit in an embodiment of the present invention is an integrated circuit mounted in a terminal device that communicates with a base station device, in which the integrated circuit causes the terminal device to exert a function of receiving, from the base station device, a measurement configuration message that includes a measurement object indicating information such as a frequency to be measured, a configuration indicating a first gap period during which communication with the terminal device is not performed temporarily, and a parameter for configuring a second gap period to the measurement object, and a function of, in a case where the parameter for configuring the second gap period is included in a measurement object of a different frequency notified from the base station device, configuring the second gap period based on the first gap period.

(11) Moreover, an integrated circuit in an embodiment of the present invention is an integrated circuit mounted in a terminal device in a radio communication system in which a base station device and the terminal device perform communication, in which the integrated circuit causes the terminal device to exert a function of receiving, from the base station device, a measurement configuration message that includes a measurement object indicating information such as a frequency to be measured, and a function of, in a case where a parameter for a cell identification time configuration is not included in the measurement object notified from the base station device, applying a given cell identification time configuration to measurement of the measurement object, and in a case where the parameter for the cell identification time configuration is included in the measurement object, applying the cell identification time configuration based on the parameter for the cell identification time configuration.

Effects of the Invention

As described above, according to embodiments of the present invention, it is possible to provide a radio communication system, a terminal device, a base station device, a radio communication method and an integrated circuit capable of searching for a cell of a different frequency efficiently.

MODE FOR CARRYING OUT THE INVENTION

Figure 1:
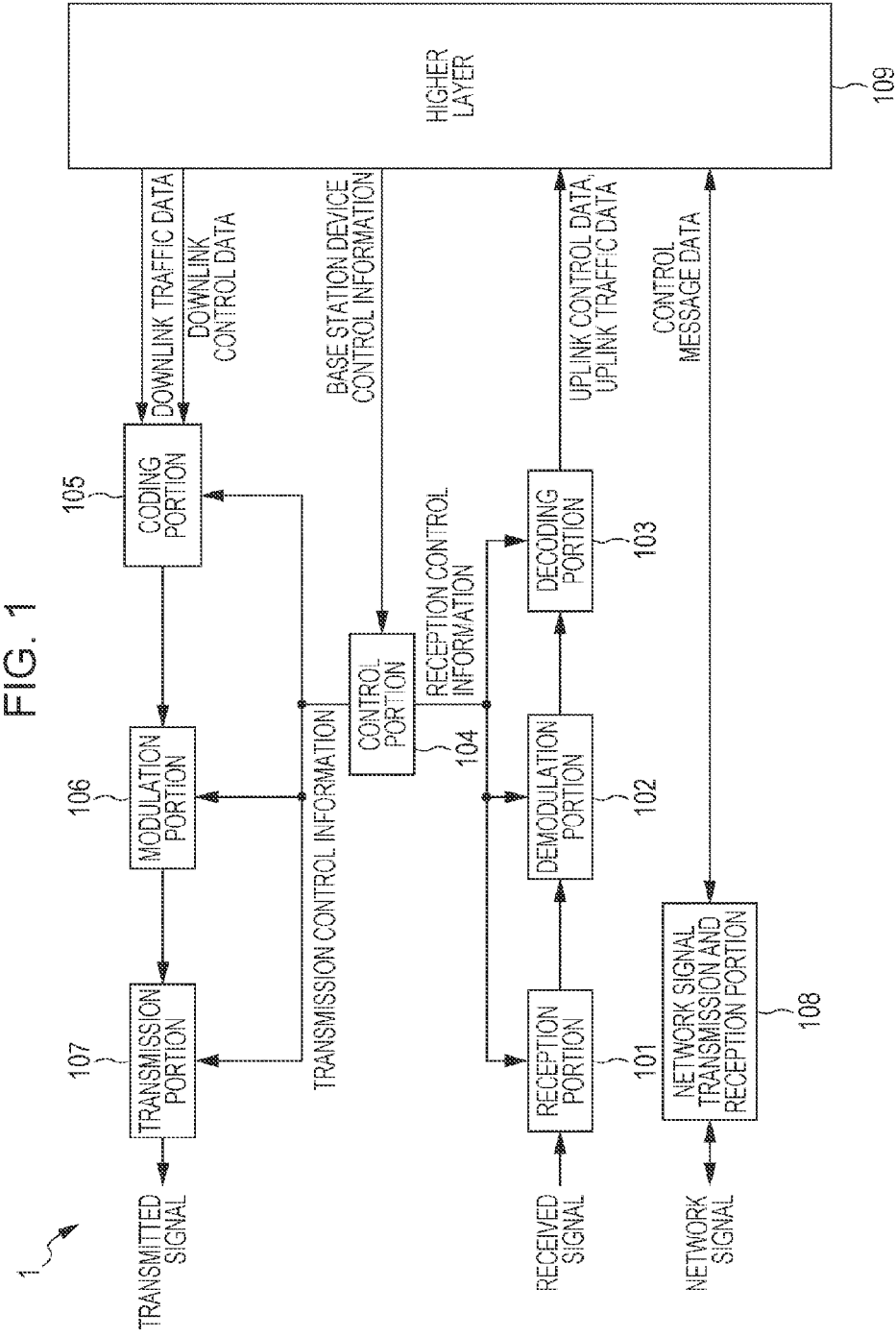
FIG. 1 is a block diagram showing one example of a base station device according to an embodiment of the present invention.

Description will be given briefly for technologies involved in each embodiment of the present invention before giving description for each embodiment of the present invention.

[Physical Channel]

Description will be given for a main physical channel (or physical signal) used for EUTRA and Advanced EUTRA. A channel means a medium used for signal transmission, and a physical channel means a physical medium used for signal transmission. There is a possibility that in the EUTRA and the advanced EUTRA, the physical channel is added or a structure or a format style thereof is modified or added in the future, but, even in the case of modification or addition, there is no influence on description of each embodiment of the present invention.

In the EUTRA and the Advanced EUTRA, scheduling of the physical channel is managed by using a radio frame. One radio frame is 10 ms and one radio frame is configured by ten subframes. Further, one subframe is configured by two slots (that is, one slot has 0.5 ms). Moreover, management is performed by using a resource block as a minimum unit of scheduling, in which physical channels are arranged. The resource block is defined as a fixed frequency region in which a frequency axis is configured by an assembly of a plurality of subcarriers (for example, twelve subcarriers) and a region configured by a fixed transmission time interval (one slot).

Synchronization signals are configured by three types of primary synchronization signals and secondary synchronization signals which are configured by 31 types of codes which are arranged alternately in a frequency region, and a combination of signals of the primary synchronization signals and the secondary synchronization signals indicates 504 cell identifiers (physical cell ID (Physical Cell Identity; PCI)) that identify a base station device and a frame timing for radio synchronization. A terminal device specifies a cell ID of synchronization signals received by cell search.

A physical broadcast channel (PBCH) is transmitted for the purpose of notifying a control parameter (broadcast information or system information) which is commonly used in terminal devices in a cell. Regarding broadcast information which is not notified by the physical broadcast channel, a radio resource is notified by a physical downlink control channel and is transmitted with a layer 3 message (system information) by a physical downlink shared channel. As the broadcast information, a cell global identifier (CGI) indicating an identifier of an individual cell, a tracking area identifier (TAI) for managing a standby area by paging, random access configuration information (such as a transmission timing timer), shared radio resource configuration information, or the like is notified.

Downlink reference signals are classified into a plurality of types depending on intended use thereof. For example, cell-specific reference signals (CRSs) are pilot signals which are transmitted with predetermined power for each cell, and are downlink reference signals which are iterated periodically in a frequency region and a time region based on a predetermined rule. The terminal device measures reception quality for each cell by receiving the cell-specific reference signals. Moreover, the terminal device uses the downlink cell-specific reference signals also as reference signals for demodulation of the physical downlink control channel or the physical downlink shared channel that is transmitted at the same time with the cell-specific reference signals. As a sequence used for the cell-specific reference signals, a sequence which is identifiable for each cell is used.

Further, the downlink reference signals are used also for estimation of channel fluctuation of the downlink. The downlink reference signals used for estimation of channel fluctuation are referred to as channel state information reference signals (CSI-RSs) or CSI reference signals. Moreover, the downlink reference signals which are configured individually for each terminal device are referred to as UE specific reference signals (URSs) or dedicated RSs (DRSs), and used for demodulation of the physical downlink control channel or the physical downlink shared channel.

The physical downlink control channel (PDCCH) is transmitted as several OFDM symbols from beginning of each subframe, and is used for the purpose of giving instruction of radio resource allocation information in accordance with scheduling of a base station device and an adjustment amount of increase and decrease in transmission power to the terminal device. The terminal device needs to acquire radio resource allocation information called uplink grant in the case of transmission and downlink grant (downlink assignment) in the case of reception from the physical downlink control channel by monitoring the physical downlink control channel addressed to the own device before transmitting and receiving a layer 3 message (paging, handover command, and the like) that is downlink data or downlink control data, and by receiving the physical downlink control channel addressed to the own device. Note that, the physical downlink control channel is also able to be configured so as to be, other than to be transmitted as the ODFM symbols described above, transmitted in a region of a resource block allocated from the base station device to the terminal device in an individual (dedicated) manner.

A physical uplink control channel (PUCCH) is used for performing a reception confirmation response (Acknowledgement/Negative Acknowledgement; ACK/NACK) of data transmitted on the physical downlink shared channel, notification of channel information (channel state information) of the downlink, and a scheduling request (SR) which is a radio resource allocation request (radio resource request) of the uplink. The channel state information (CSI) includes CQI (Channel Quality Indicator), PMI (Precoding Matrix Indicator), PTI (Precoding Type Indicator), and RI (Rank Indicator). Each indicator is represented as indication in some cases, but intended use and meaning thereof are same.

The physical downlink shared channel (PDSCH) is used also for notifying the terminal device of broadcast information (system information) which is not notified by paging or the physical broadcast channel in addition to downlink data as the layer 3 message. Radio resource allocation information of the physical downlink shared channel is indicated by the physical downlink control channel.

A physical uplink shared channel (PUSCH) mainly transmits uplink data and uplink control data, and is also able to include reception quality of the downlink and control data such as ACK/NACK. Moreover, it is used for notifying the base station device of the uplink control information in addition to the uplink data as the layer 3 message. Further, in the same manner as the case of the downlink, radio resource allocation information of the physical uplink shared channel is indicated on the physical downlink control channel.

An uplink reference signal (also referred to as an uplink pilot signal or an uplink pilot channel) includes a demodulation reference signal (DMRS) which is used by the base station device for demodulating the physical uplink control channel PUCCH and/or the physical uplink shared channel PUSCH, and a sounding reference signal (SRS) which is used by the base station device mainly for estimating the channel state of the uplink. Moreover, as the sounding reference signal, there are a periodic sounding reference signal (Periodic SRS) and an aperiodic sounding reference signal (Aperiodic SRS).

A physical random access channel (PRACH) is a channel which is used for notifying a preamble sequence and has a guard time. The preamble sequence is configured so as to indicate 6-bit information by preparing sixty four types of sequences. The physical random access channel is used as access means to the base station device from the terminal device. The terminal device uses the physical random access channel for making a radio resource request when the physical uplink control channel is not configured, or requesting transmission timing adjustment information (also called timing advance; TA) which is required for aligning an uplink transmission timing to a reception timing window of the base station device to the base station device.

Specifically, the terminal device transmits the preamble sequence by using the radio resource for the physical random access channel that is configured by the base station device. The terminal device which has received the transmission timing adjustment information configures a transmission timing timer for counting an effective time of the transmission timing adjustment information which is configured commonly by broadcast information (or configured individually by the layer 3 message) to manage an uplink state as a transmission timing adjusted state during an effective time of the transmission timing timer (during counting) and as a transmission timing non-adjusted state (transmission timing un-adjusted state) other than the effective period (during stopping). The layer 3 message is a message of control plane which is exchanged between RRC (radio resource control) layers of the terminal device and the base station device, and is used synonymously with RRC signaling or an RRC message. Note that, since physical channels other than above are not concerned with each embodiment of the present invention, detailed description thereof will be omitted.

[Measurement]

Figure 14:
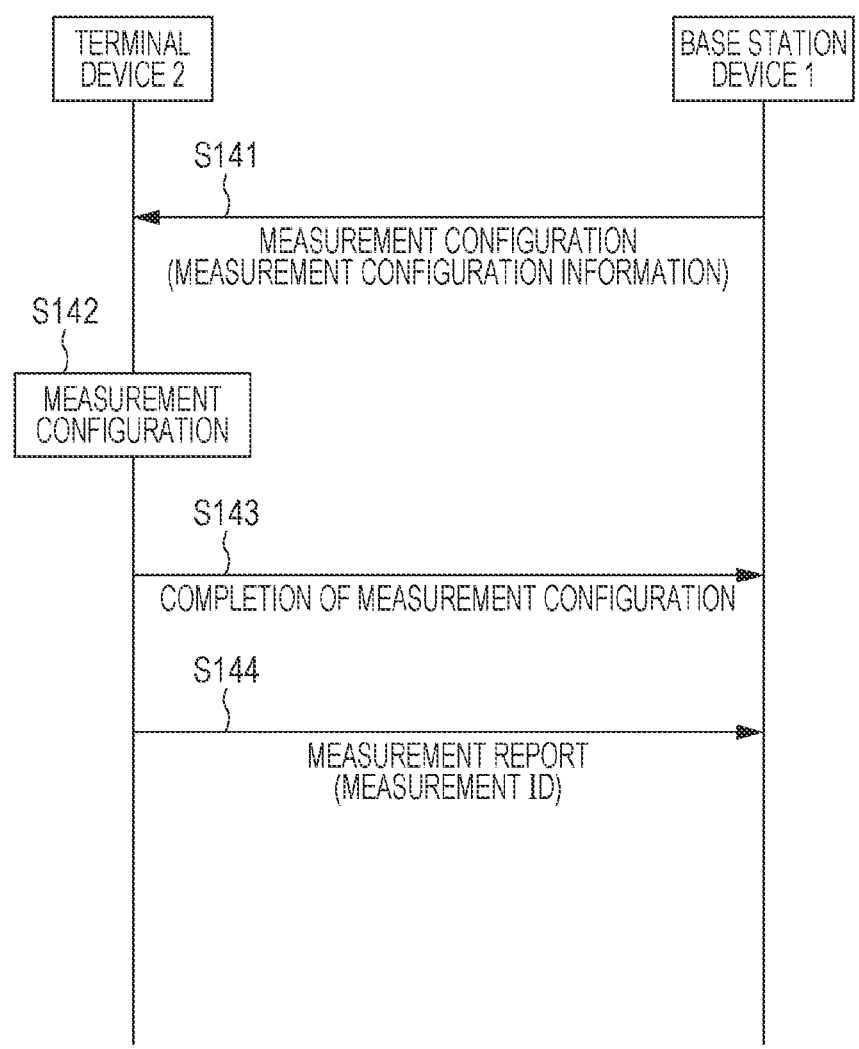
FIG. 14 is a sequence chart showing one example of a conventional RRM measurement configuration management procedure.

FIG. 14 is a sequence chart for explaining a radio resource management (RRM) measurement configuration management method of a terminal device 2 and a base station device 1 in EUTRA.

In an example of FIG. 14, the base station device 1 is able to use two different frequencies of F1 and F2 as frequencies handled by the own station, and the terminal device 2 and the base station device 1 are in a state where radio connection is established (radio resource control connected (RRC_Connected)) at the frequency F1. Here, the base station device 1 transmits a message including a measurement configuration (hereinafter, referred to as a measurement configuration message) for measuring reception quality of a cell in communication (serving cell) and other cell (neighboring cell) to the terminal device 2 (step S141). The measurement configuration message includes at least one measurement configuration information for each of the frequencies to be measured (frequency F1 and frequency F2). The measurement configuration information is configured by a measurement ID, a measurement object, a measurement object ID corresponding to the measurement object, a report configuration including a measurement event, and a report configuration ID corresponding to the report configuration. It may be configured so that a plurality of report configuration IDs are linked to one measurement object ID. In the same manner, it may be configured so that one report configuration ID is linked to a plurality of measurement object IDs.

Moreover, the measurement configuration message is also able to include a measurement gap configuration (measGapConfig) and a threshold called s-Measure.

The measurement gap configuration is such that in order for the terminal device 2 to measure a cell of a different frequency or a neighboring cell of a different radio communication technology system, the base station device 1 configures a period during which transmission to the terminal device 2 is not performed in a serving cell (gap period) to notify the terminal device 2, and thereby, the terminal device 2 is able to measure a neighboring cell of the different frequency and a neighboring cell of the different radio communication technology system by interrupting reception operation at the serving cell. In this measurement gap configuration, parameters of a gap pattern identifier (gp0 or gp1) and a value of the gap pattern identifier (gap offset) are notified. A measurement gap length (MGL), a measurement gap repetitive period (MGRP) and a minimum measurement time during a period of 480 ms (Tinter1) are decided based on the notified gap pattern identifier, and a start timing of the measurement gap is decided based on the notified gap offset. The aforementioned MGL, MGRP, Tinter1 and gap offset are collectively referred to as a measurement-gap-related parameter in the present application. Further, one measurement gap configuration is able to be configured to the terminal device 2, and the terminal device 2 takes measurement for all of different frequencies and different radio communication technology systems by using this gap period. Moreover, a time for detecting and measuring a cell is regulated based on the measurement gap configuration, the number of different frequencies of a measurement object, a type of a radio communication technology, and other configuration, and the terminal device 2 needs to perform detection and measurement of the cell within this regulated time. For example, when discontinuous reception (DRX) is not configured in a frequency division duplex (FDD) system, the terminal device 2 which takes measurement with Nfreq pieces of different frequencies needs to be able to detect a cell of the EUTRA that exists at each frequency within $T_{identify\_inter}=480\times480\div Tinter1\times Nfreq$ [ms].

The s-Measure is a parameter for configuring so as to take neighboring cell measurement when receiving power of a serving cell is less than a threshold (s-Measure), and is able to prevent unnecessary neighboring cell measurement for handover when communication quality of the serving cell is good. One s-Measure is able to be configured for the terminal device 2, and when it is configured t to 0 or when it is not configured, the terminal device 2 takes measurement which is configured at all times regardless of quality of the serving cell.

Next, description will be given for a measurement configuration message by taking a specific example. Here, description will be given by using FIG. 15 for a case where two measurement objects (frequency F1 and frequency F2) and three report configurations are notified and three measurement IDs are configured to combinations of the aforementioned measurement objects and report configurations.

The base station device 1 allocates identifiers 0 and 1 as measurement object IDs to the frequencies F1 and F2 as the measurement objects, respectively, to notify the terminal device 2. Moreover, the base station device 1 allocates identifiers 0, 1 and 2 as report configuration IDs to a report configuration 1, a report configuration 2 and a report configuration 3 as the report configurations, respectively, to notify the terminal device 2. Further, the base station device 1 notifies the terminal device 2 of the measurement IDs which are associated with (linked to) combinations of the aforementioned identifiers of the measurement objects and the aforementioned identifiers of the report configurations. Further, the base station device 1 notifies the terminal device 2 of measurement gap configuration, s-Measure or the like as necessary.

Figure 15:
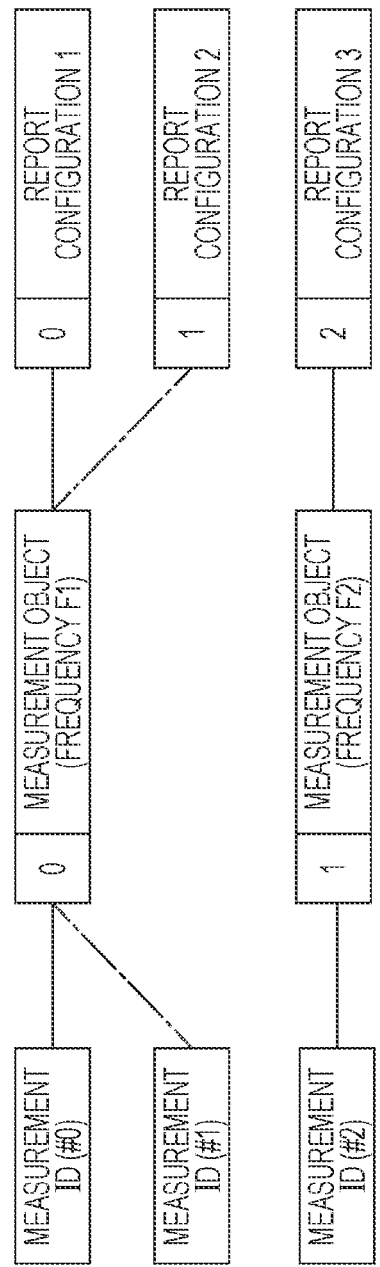
FIG. 15 is a view showing one example of a conventional RRM measurement configuration.

In FIG. 15, as a measurement ID #0, a combination of the measurement object of the identifier 0 (frequency F1) and the report configuration of the identifier 0 is specified. In the same manner, a combination of the measurement object of the identifier 0 (frequency F1) and the report configuration of the identifier 1 is specified to a measurement ID #1, and a combination of the measurement object of the identifier 1 (frequency F2) and the report configuration of the identifier 2 is specified to a measurement ID #2.

Moreover, the measurement event information is information configured by measurement events indicating conditions, for example, including when reception quality of a cell-specific reference signal of a serving cell is less than/more than a predetermined threshold, when reception quality of a cell-specific reference signal of a neighboring cell is less than that of the serving cell, and when reception quality of the neighboring cell is more than a predetermined threshold, and parameters used for determining these conditions. For the parameters, information such as a threshold, an offset value, a time required to establish a measurement event and the like are configured. In NPL 3, for example, as a measurement event A1, it is defined to make a report when reception quality of a serving cell becomes more excellent than a threshold. Moreover, as a measurement event A3, it is defined to make a report when reception quality of a neighboring cell becomes more excellent than one obtained by adding an offset value to the reception quality of the serving cell. Further, as a measurement event A4, it is defined to make a report when the reception quality of the neighboring cell becomes more excellent than a threshold.

The terminal device 2 saves the measurement configuration information, which is configured from the base station device 1, as internal information at step S142. When the measurement configuration information was able to be configured without error, the terminal device 2 then transmits a message indicating completion of a measurement configuration (measurement configuration completion message) to the base station device 1 at step S143. The terminal device 2 performs management by associating the measurement ID, the measurement object ID and the report configuration ID so as to be linked in one as described above and starts measurement based on measurement information corresponding to each ID. When these three IDs are linked in one, related measurement is started by regarding as effective, and when these three IDs are not linked in one (when any of the IDs is not configured), the related measurement is not started by regarding as ineffective. When measurement of a different frequency or a different radio communication technology system is configured, the terminal device 2 takes measurement by using a gap period based on the measurement gap configuration. Moreover, in a case where the s-Measure is notified, the terminal device 2 may take measurement of the neighboring cell only when receiving power of the serving cell is less than the threshold (s-Measure).

In addition, when any of the measurement events which are configured satisfies condition in accordance with the parameter in the terminal device 2, this measurement event is set as being triggered and a measurement report message is transmitted to the base station device 1 (step S144). The measurement report message is reported with at least the measurement ID which is linked to the report configuration ID of the measurement event which is triggered and a measurement result of a related cell if necessary configured. Since the base station device 1 grasps to which report configuration ID of the measurement event the measurement ID is linked, the terminal device 2 does not need to notify the report configuration ID with the measurement report message.

Description will hereinafter be given in detail for preferable embodiments of the present invention with reference to accompanying drawings while considering above matters. Note that, in the description of the embodiments of the present invention, when specific description of well-known functions or configurations related to the embodiments of the present invention may be considered as making the subject matter of the embodiments of the present invention unclear, the detailed description thereof will be omitted.

First Embodiment

Description will be given below for a first embodiment of the present invention.

FIG. 1 is a block diagram showing one example of a base station device 1 according to the embodiment of the present invention. This base station device 1 is configured by a reception portion 101, a demodulation portion 102, a decoding portion 103, a control portion 104, a coding portion 105, a modulation portion 106, a transmission portion 107, a network signal transmission and reception portion 108 and a higher layer 109.

The higher layer 109 outputs downlink traffic data and downlink control data to the coding portion 105. The coding portion 105 codes each data which is input to output to the modulation portion 106. The modulation portion 106 performs modulation of a signal input from the coding portion 105. Moreover, the signal modulated in the modulation portion 106 is superimposed with a downlink reference signal and mapped as a signal of a frequency region. The transmission portion 107 converts the signal input from the modulation portion 106 into a signal of a time region, and transmits the converted signal while carrying on a carrier wave of a given frequency to perform power amplification. A downlink data channel in which the downlink control data is arranged typically configures a layer 3 message (RRC (Radio Resource Control) message).

Moreover, the reception portion 101 converts a received signal from a terminal device 2 (refer to FIG. 2) into a base-band digital signal. The digital signal converted at the reception portion 101 is input to the demodulation portion 102 and demodulated. The signal demodulated at the demodulation portion 102 is subsequently input to the decoding portion 103 and decoded. The decoding portion 103 appropriately separates the received signal into uplink traffic data and uplink control data and outputs each of them to the higher layer 109.

Base station device control information needed for controlling each of these blocks is input to the control portion 104 by the higher layer 109, and the control portion 104 appropriately inputs the base station device control information related to transmission as transmission control information to each of the blocks of the coding portion 105, the modulation portion 106 and the transmission portion 107, and the base station device control information related to reception as reception control information to each of the blocks of the reception portion 101, the demodulation portion 102 and the decoding portion 103.

On the other hand, the network signal transmission and reception portion 108 performs transmission or reception of a control message between a plurality of base station devices 1 (or between a control station device (MME), a gateway device (Gateway), an MCE and the base station device 1). The control message is transmitted or received via a network line. The control message is exchanged on a logical interface called an S1 interface, an X2 interface, an M1 interface or an M2 interface. Other components of the base station device 1 are not involved with the present embodiment and thus omitted in FIG. 1.

Figure 2:
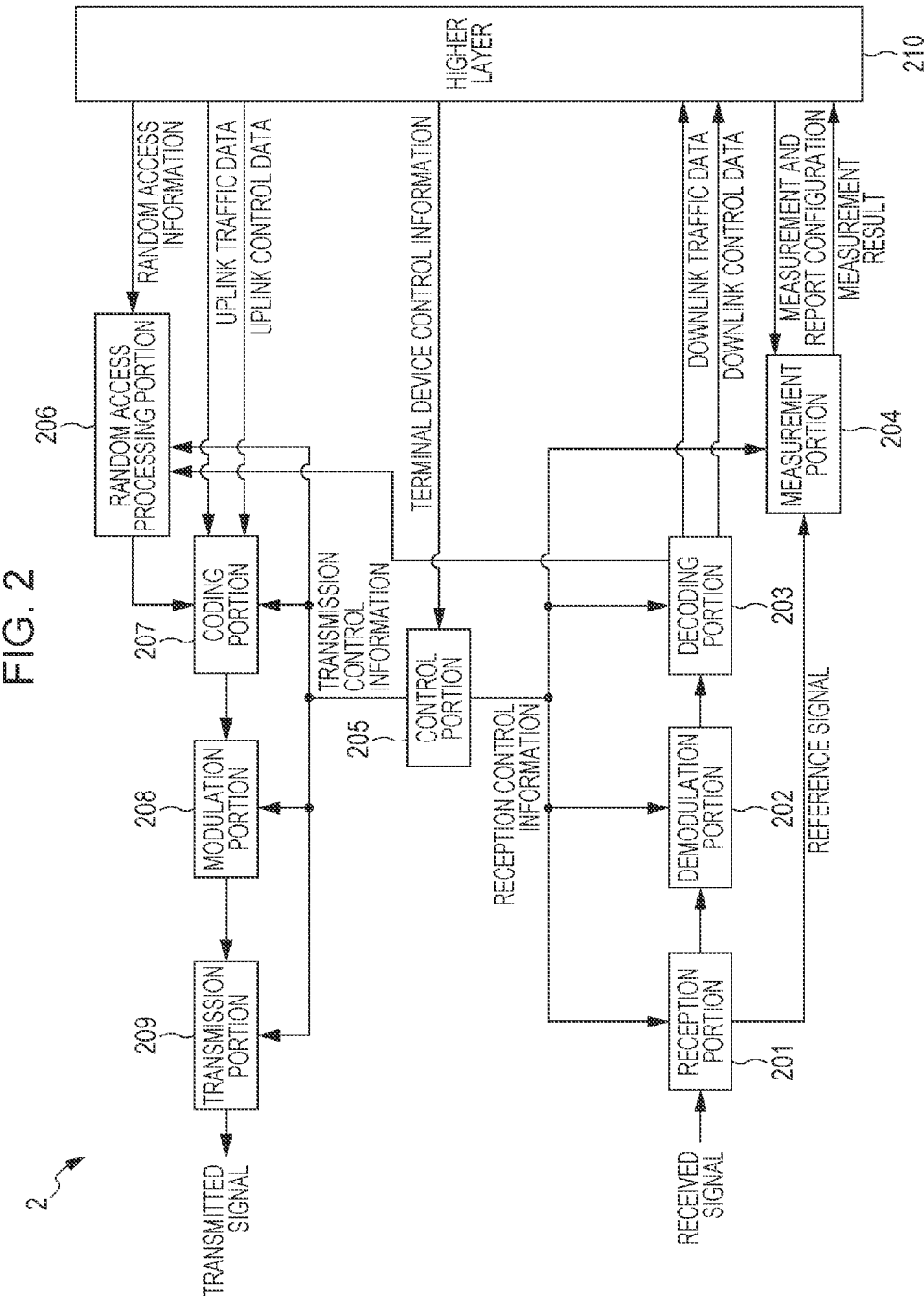
FIG. 2 is a block diagram showing one example of a terminal device according to the embodiment of the present invention.

FIG. 2 is a block diagram showing one example of the terminal device 2 according to the embodiment of the present invention. This terminal device 2 is configured by a reception portion 201, a demodulation portion 202, a decoding portion 203, a measurement portion 204, a control portion 205, a random access processing portion 206, a coding portion 207, a modulation portion 208, a transmission portion 209 and a higher layer 210.

Prior to reception, the higher layer 210 outputs terminal device control information to the control portion 205. The control portion 205 appropriately outputs the terminal device control information related to reception as reception control information to the reception portion 201, the demodulation portion 202, the decoding portion 203 and the measurement portion 204. The reception control information includes information of demodulation information, decoding information, information of a reception frequency band, a reception timing related to each channel, a multiplexing method and radio resource arrangement information as reception schedule information as reception scheduling information.

The reception portion 201 receives a signal from the base station device 1 described below through one or more not-shown receivers in a frequency band which is notified with the reception control information, and converts the received signal into a base-band digital signal to output to the demodulation portion 202. Further, the reception portion 201 outputs a received reference signal to the measurement portion 204. The demodulation portion 202 demodulates the received signal to output to the decoding portion 203. The decoding portion 203 correctly decodes the demodulated signal based on the reception control information, appropriately separates it into downlink traffic data and downlink control data, and outputs each of them to the higher layer 210. When a measurement configuration message is included in the signal decoded at the decoding portion 203, the higher layer 210 notifies the measurement portion 204 of measurement and report configuration specified with the aforementioned measurement configuration message. The measurement portion 204 measures RSRP. RSRQ and the like of the received reference signal and outputs a measurement result thereof to the higher layer 210.

Moreover, prior to transmission, the higher layer 210 outputs terminal device control information to the control portion 205. The control portion 205 appropriately outputs the terminal device control information related to transmission as transmission control information to the random access processing portion 206, the coding portion 207, the modulation portion 208 and the transmission portion 209. The transmission control information includes information of coding information, modulation information, information of a transmission frequency band, a transmission timing related to each channel, a multiplexing method and radio resource arrangement information as uplink scheduling information of a transmitted signal.

The higher layer 210 appropriately outputs uplink traffic data and uplink control data to the coding portion 207 according to an uplink channel. In accordance with the transmission control information, the coding portion 207 appropriately codes each data to output to the modulation portion 208. The modulation portion 208 performs modulation of a signal which is coded at the coding portion 207. Moreover, the modulation portion 208 multiplexes a downlink reference signal with the modulated signal, followed by mapping into a frequency band.

The transmission portion 209 converts the signal of the frequency band, which is output from the modulation portion 208, into a signal of a time region, and transmits the converted signal from one or more not-shown transmitters while carrying on a carrier wave of a given frequency to perform power amplification.

Other components of the terminal device 2 are not involved with the present embodiment and thus omitted in FIG. 2.

Figure 3:
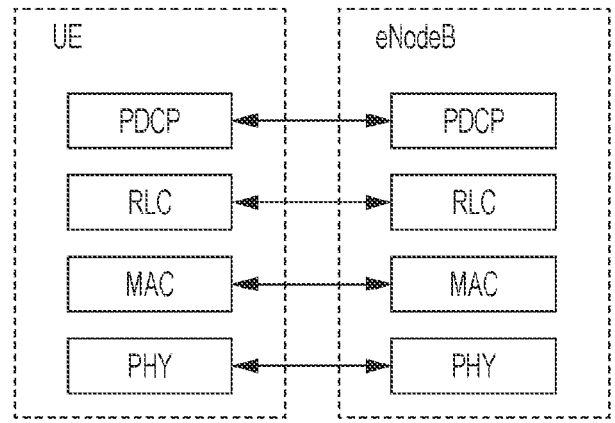
FIG. 3 is a view showing a user plane architecture of the base station device and the terminal device according to the embodiment of the present invention.
Figure 4:
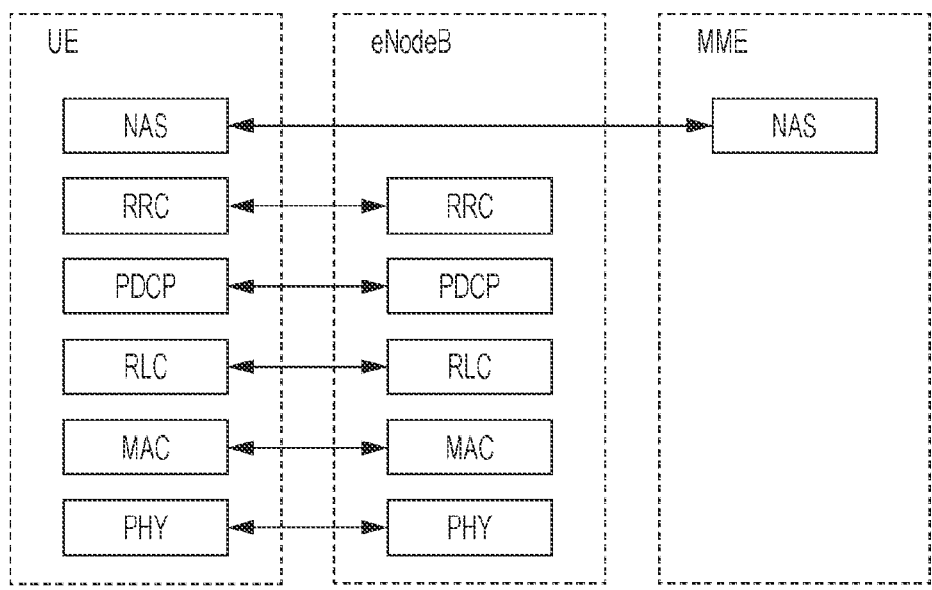
FIG. 4 is a view showing a control plane architecture of the base station device and the terminal device according to the embodiment of the present invention.

Next, an architecture of a radio interface protocol between the base station device and the terminal device is shown. FIG. 3 is a block diagram showing a radio protocol architecture of a user plane (U-plane). Moreover, FIG. 4 is a block diagram showing a radio protocol architecture of a control plane (C-plane). The user plane is a protocol stack for transmitting and receiving user data, and the control plane is a protocol stack for transmitting and receiving a control signal.

In FIG. 3 and FIG. 4, in a physical layer (PHY) which is a first hierarchy (layer 1), communication is performed between different physical hierarchies, that is, between the physical layers on a transmission side and a reception side by using the physical channel described above. The physical layer is coupled to a higher medium access control (MAC) layer through a transport channel, and the physical layer performs information transfer service to the MAC layer through this transport channel.

In the MAC layer of a second hierarchy (layer 2), mapping of a logical channel and the transport channel, error correction by HARQ (Hybrid Automatic Repeat reQuest), transfer processing based on priority between the logical channels, and the like are performed. The MAC layer is coupled to a radio link control (RLC) layer which is a higher hierarchy through the logical channel.

The RLC layer of the second hierarchy supports reliability of data transfer. There are three types of operation modes including a transparent mode (TM), an unacknowledged mode (UM) and an acknowledged mode (AM) in the RLC layer according to a data transmission method. In the AM, error correction and protocol error detection by ARQ, etc., are performed.

A PDCP (Packet Data Convergence Protocol) layer in the second hierarchy performs header compression for reducing an IP packet header size, data encryption, decryption of encrypted one and the like.

A radio resource control (RRC) layer in a third hierarchy (layer 3) is defined only by the control plane. The RRC layer performs broadcasting of NAS (non-access stratum) or AS (access stratum) related information, management of RRC connection (establishment/maintenance/release), configuration, re-configuration and release of a radio bearer (RB), mobility (handover), management and reporting of measurement, Qos management and the like.

The NAS layer positioned above the RRC layer performs session management, mobility management and the like.

Here, the MAC layer and the RRC layer of the base station device 1 exist as a part of the higher layer 109. Moreover, the MAC layer of the terminal device 2 exists as a part of the random access processing portion 206 and the higher layer 209, and the RRC layer of the terminal device 2 exists as a part of the measurement portion 204 and the higher layer 209.

Next, description will be given for a measurement configuration in the present embodiment.

In the same manner as the conventional RRM measurement configuration described above, the measurement configuration in the present embodiment is configured by a measurement ID, a measurement object, a measurement object ID corresponding to the measurement object, a report configuration including a measurement event, and a report configuration ID corresponding to the report configuration. Further, it is defined in the present embodiment so that a configuration of the measurement object is able to include a gap configuration for small-cell measurement.

Here, in each embodiment of the present invention described below, measurement of a different frequency cell is classified into "ordinary measurement" and "small-cell measurement", in which the "ordinary measurement" is conventional measurement mainly aiming to maintain connection when receiving power of a serving cell is reduced or move to a frequency layer having higher priority or the like, and the "small-cell measurement" is to measure a cell of a different frequency mainly aiming offload. That is, it should be noted that the measurement of a small cell aiming to maintain connection is a target of the "ordinary measurement" of the present application and the measurement of a small cell is not necessarily classified into the "small-cell measurement".

Figure 5:
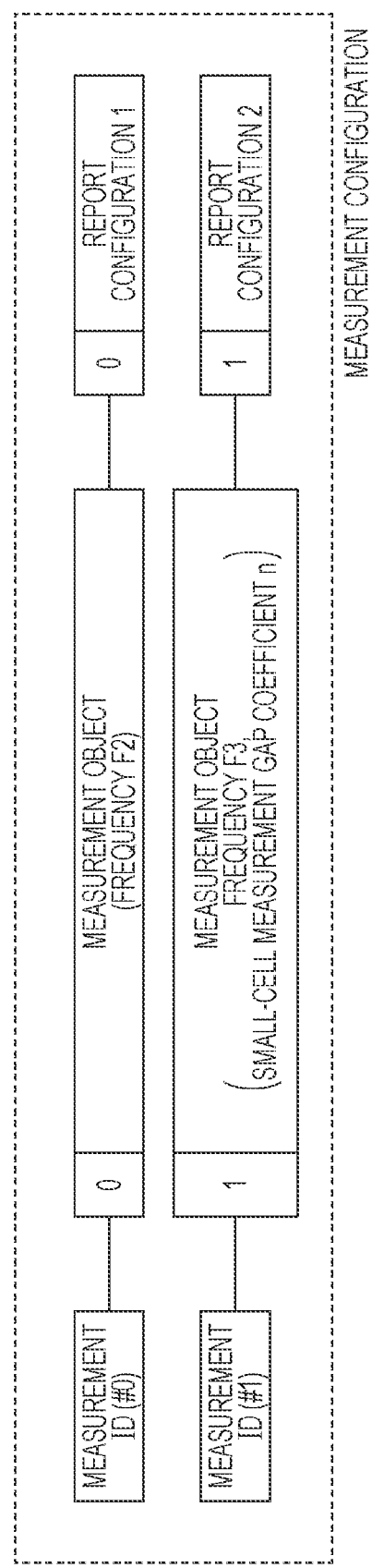
FIG. 5 is a view showing one example of a measurement configuration in a first embodiment of the present invention.

An example that two measurement objects are defined as the measurement configuration is shown in FIG. 5. In the measurement configuration, a report configuration is included in addition to the measurement object and a measurement ID is configured to a combination of the aforementioned measurement object and report configuration.

In FIG. 5, a combination of a measurement object (frequency F2) of an identifier 0 and a report configuration 1 of an identifier 0 is specified as a measurement ID #0. In the same manner, a combination of a measurement object (frequency F3, gap configuration for small-cell measurement) of an identifier 1 and a report configuration 2 of an identifier 1 is specified as a measurement ID #1. Moreover, it is set here that the event A1 described above is specified as the measurement event for the report configuration 1 and the event A3 described above is specified as the measurement event for the report configuration 2.

Figure 6:
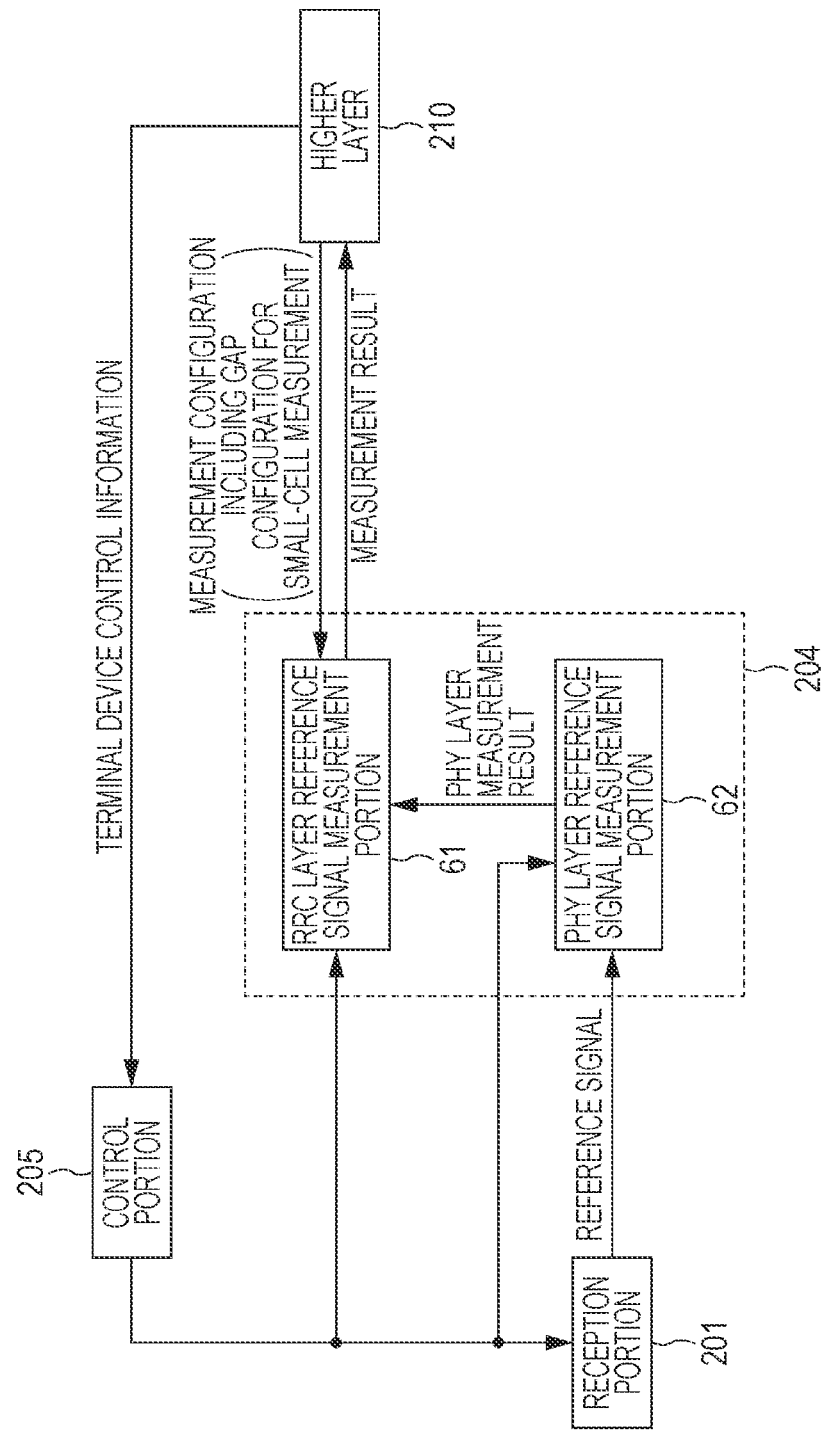
FIG. 6 is a block diagram showing one example of a measurement portion of a terminal device in the first embodiment of the present invention.

Next, description will be given for the measurement portion 204 in the present embodiment by using FIG. 6.

The measurement portion 204 includes an RRC layer reference signal measurement portion 61 and a PHY layer reference signal measurement portion 62. The PHY layer reference signal measurement portion 62 measures RSRP and RSRQ of a reference signal input from the reception portion 201, a channel state and the like to notify the RRC layer reference signal measurement portion 61. The RRC layer reference signal measurement portion 61 averages, if necessary, individual measurement results notified from the PHY layer reference signal measurement portion 62 for the measurement object which is configured by the measurement configuration notified from the higher layer 210 to consider whether or not to be matched with the report configuration, and notifies the measurement results to the higher layer 210. Here, when a gap configuration for small-cell measurement is included in the measurement object of the measurement configuration notified from the higher layer 210, the measurement portion 204 considers that this measurement object is the configuration for the small-cell measurement.

Here, the terminal device 2, when the gap configuration for small-cell measurement is included in the measurement object of the measurement configuration message notified from the base station device 1 as described above, may consider that this measurement object is the configuration for small-cell measurement, or when information of one bit indicating small-cell measurement is included in the measurement object, may consider that this measurement object is the configuration for small-cell measurement. Alternatively, information of two bits or more may be included in the measurement object to show that this measurement object is the configuration for small-cell measurement, a configuration for ordinary measurement, or a configuration for taking both of small-cell measurement and ordinary measurement.

Further, the gap configuration for small-cell measurement is information needed for configuring a measurement-gap-related parameter for use in small-cell measurement, and, for example, may be the measurement-gap-related parameter for use in small-cell measurement itself (a part or all of MGL, MGRP, Tinter1, and gap offset), bit information indicating whether or not a measurement-gap-related parameter which is notified or prescribed in advance is applied to the corresponding measurement object, or a measurement gap coefficient n described below.

Subsequently, description will be given for one example of measurement procedure of the terminal device 2 in a communication system of the present embodiment by using a flowchart of FIG. 7.

Figure 7:
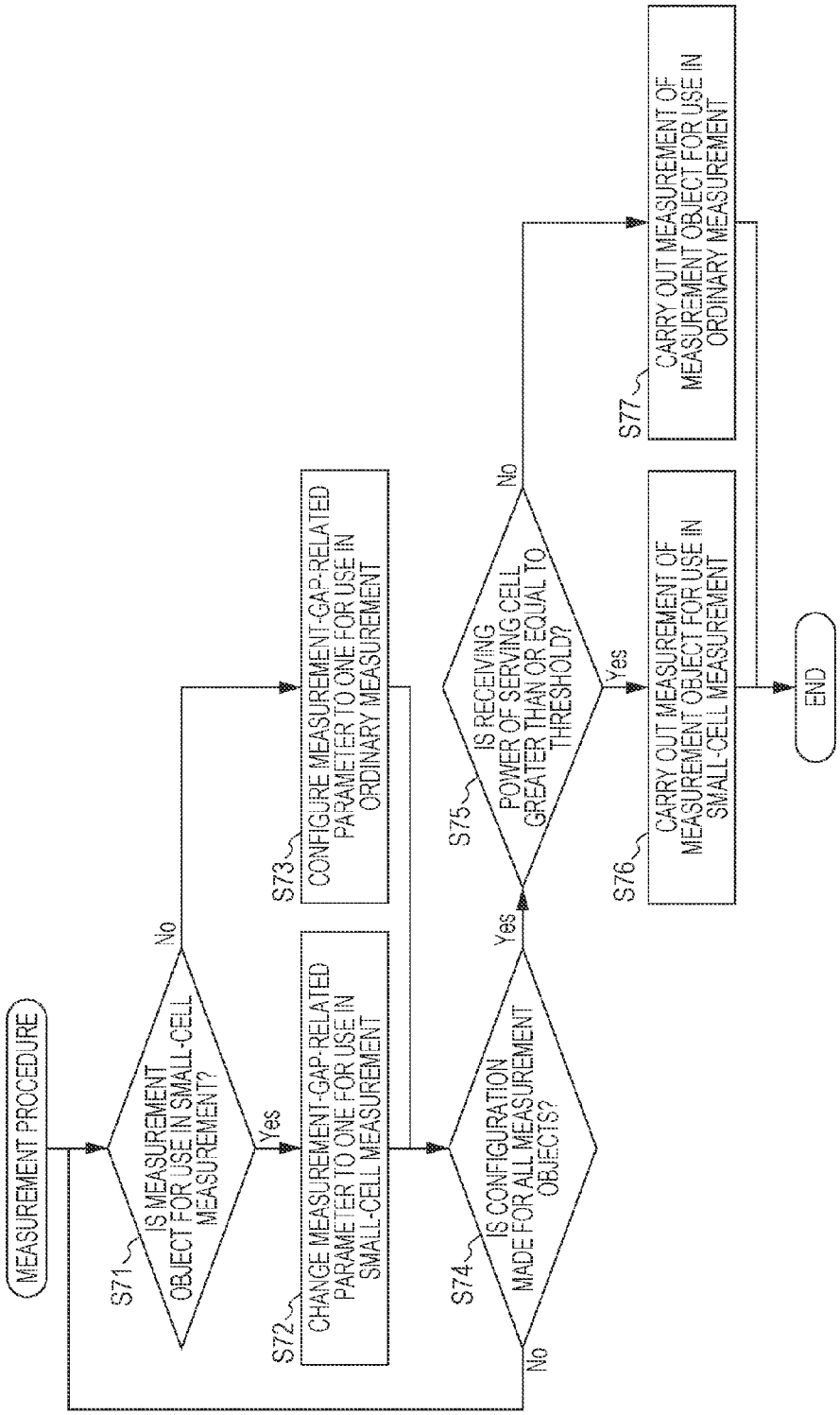
FIG. 7 is a flowchart showing one example of measurement procedure of the terminal device 2 in the first embodiment of the present invention.

In FIG. 7, first, the terminal device 2 receives a measurement configuration message from the base station device 1, and, based on whether or not the gap configuration for small-cell measurement described above is included in a measurement object, determines whether or not this measurement object is for use in small-cell measurement (step S71). When the measurement object is for use in small-cell measurement (Yes at step S71), a measurement-gap-related parameter is changed to one for use in small-cell measurement (step S72), and the flow shifts to step S74. When the measurement object is for use in ordinary measurement (No at step S71), a configuration is made so that the measurement-gap-related parameter which is configured based on a gap offset notified from the base station device 1 is used as it is (step S73), and the flow shifts to step S74. At step S74, the terminal device 2 determines whether or not the aforementioned configuration is made for all measurement objects requiring a measurement gap, which are configured to the own device, and when there is a measurement object to which the configuration is not made, the flow shifts to step S71 to make a configuration of a measurement-gap-related parameter of a next measurement object. When the aforementioned configuration is made for all the measurement objects requiring a measurement gap, which are configured to the own device, at step S74, the flow shifts to step S75. The terminal device 2 measures receiving power of a serving cell in which the own device is present and makes comparison with a threshold (s-Measure) at step S75. When the receiving power of the serving cell is greater than or equal to the threshold (Yes at step S75), measurement of the measurement object for use in small-cell measurement is carried out (step S76). When the receiving power of the serving cell is less than the threshold (No at step S75), measurement of the measurement object for use in ordinary measurement is carried out (step S77).

As described above, when information of whether or not to be for use in small-cell measurement is included in the configuration of the measurement object and the terminal device 2 switches small-cell measurement and ordinary measurement based on quality (receiving power) of the serving cell, it becomes possible to apply a configuration of the measurement gap suitable for each measurement and to search for a different frequency cell efficiently.

Further, measurement of the measurement object for use in small-cell measurement may not be performed not only when the receiving power of the serving cell is less than the threshold but when a mobility state estimation value (MSE) of the terminal device 2 exceeds a threshold (for example, in the case of middle speed or more or in the case of high speed when the estimation value is represented by low speed, middle speed or high speed). That is, when small-cell measurement itself is not performed when the terminal device 2, even if being connected to a small cell, falls out of the cell immediately (at the time of high-speed movement), it becomes possible to search for a different frequency cell efficiently. The aforementioned threshold of the mobility state estimation value may be configured individually for each measurement object, or may be common in all the measurement objects for use in small-cell measurement. In a case where the threshold is configured for each measurement object, for example, when a cell size of a small cell is different for each frequency, etc., by setting the threshold as "high speed" at the frequency with a large cell size and setting the threshold as "middle speed" at the frequency with a small cell size, it becomes possible to search for a different frequency cell efficiently according to the cell size handled at each frequency.

Moreover, in conventional measurement, when a measurement object is a different frequency, time for cell identification is specified in consideration of the number of frequencies to be measured. However, when small-cell measurement and ordinary measurement are taken exclusively as described above, if the measurement object for small-cell measurement is included in calculation of time for cell identification in ordinary measurement, a conventional requirement condition is not satisfied in ordinary measurement. Therefore, when carrying out ordinary measurement, it is preferable that a frequency of small-cell measurement is not included in calculation of Tidentify_inter or the like (that is, a frequency of small-cell measurement is not included in Nfreq). Further, to the contrary, when carrying out small-cell measurement, it is preferable that a frequency of ordinary measurement is not included in calculation of Tidentify_inter or the like (that is, frequency of ordinary measurement is not included in Nfreq). Here, when measurement of the frequency of small-cell measurement is configured also to ordinary measurement, this frequency is preferably included in Nfreq of both of them.

Next, description will be given for a case where the measurement gap coefficient n is notified as a gap configuration for small-cell measurement in the present embodiment.

Figure 8:
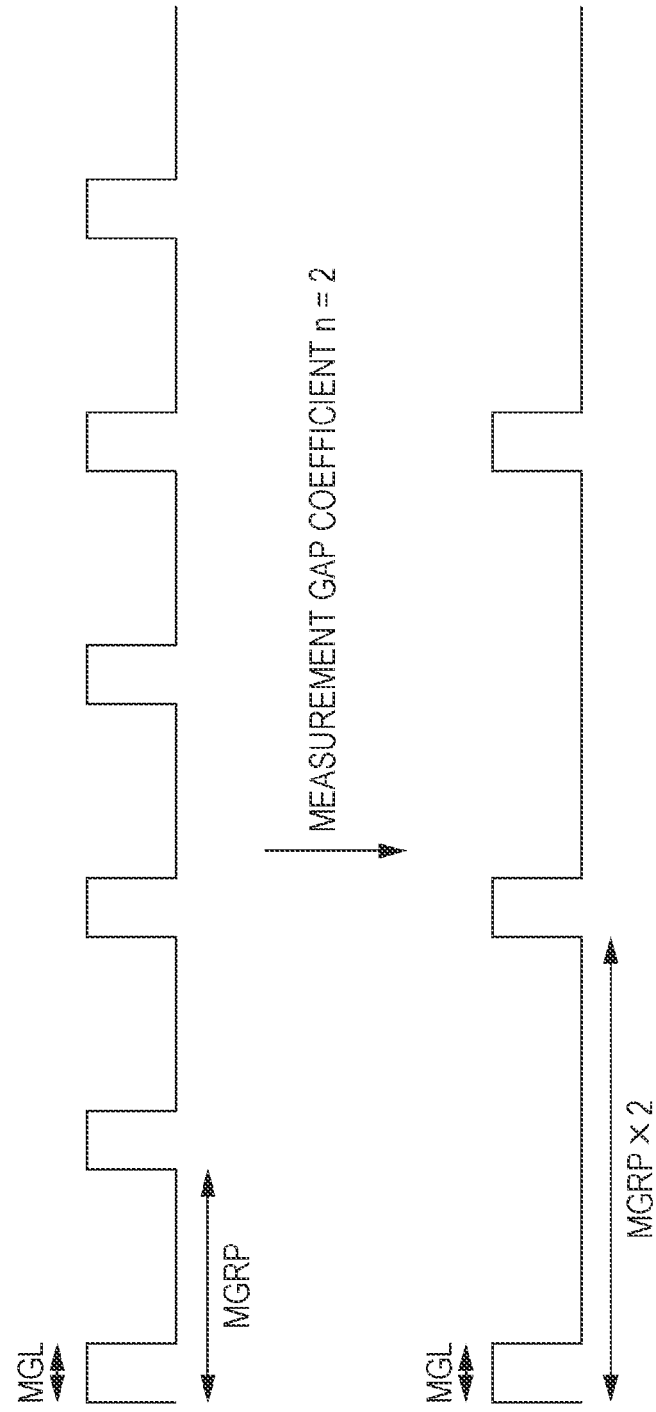
FIG. 8 is a view showing one example of changing of a measurement-gap-related parameter by using a measurement gap coefficient n in the first embodiment of the present invention.

This measurement gap coefficient n is used for changing a part of a measurement-gap-related parameter. For example, as shown in FIG. 8, a measurement gap repetitive period (MGRP) is multiplied by n to make such a configuration that a period of a measurement gap becomes longer than a period for ordinary measurement. Further, a configuration may be made so that time for cell identification (Tidentify_inter) becomes long by multiplying Tinter1 by 1/n. In this manner, the terminal device 2 which is notified of the measurement object including the measurement gap coefficient n regards this measurement object as the measurement object for use in small-cell measurement and changes MGRP and Tidentify_inter which are configured for ordinary measurement, so that power saving for different frequency cell search aiming offload becomes possible.

Figure 9:
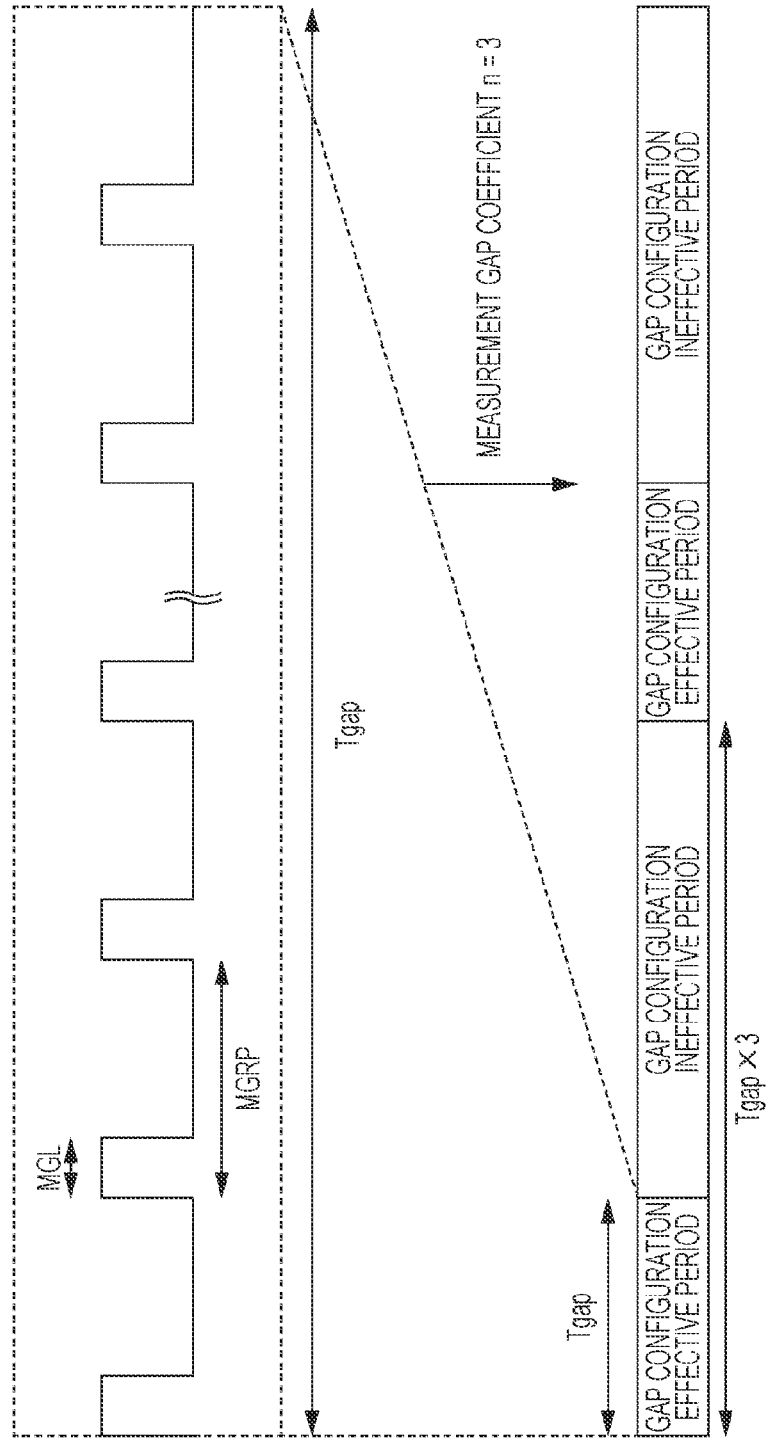
FIG. 9 is a view showing another example of changing of the measurement-gap-related parameter by using the measurement gap coefficient n in the first embodiment of the present invention.

Further, as another example, as shown in FIG. 9, a gap configuration defined by MGL and MGRP may be made effective for a fixed period (Tgap) and a gap configuration may be made ineffective for a subsequent period of Tgap x (n−1). In this manner, the terminal device 2 which is notified of the measurement object including the measurement gap coefficient n regards this measurement object as the measurement object for use in small-cell measurement, and uses the measurement gap coefficient n to configure the period during which small-cell measurement using the measurement-gap-related parameter which is determined based on the measurement gap configuration (gp0 or gp1) notified for ordinary measurement is made effective and the period during which it is made ineffective, so that power saving for different frequency cell search aiming offload becomes possible.

Moreover, the aforementioned measurement gap coefficient n may be changed according to the mobility state estimation value of the terminal device 2. A changing method may be scaling by the mobility state estimation value (performing weighting so that n becomes small as speed becomes high) or may be notification of n (nHigh, nMid, nLow) for each mobility state estimation value (for example, for each of high speed, middle speed and low speed). At this time, when n is 0, small-cell measurement for the corresponding measurement object may not be performed. For example, by setting values of nHigh and nMid to 0, it is possible to cause only the terminal device 2 which moves at low speed to take small-cell measurement, so that it becomes possible to search for a different frequency cell efficiently.

Though description has been given here for introduction of the measurement gap coefficient n as a specific example, without limitation thereto, a configuration may be merely made so that a measurement gap used for small-cell measurement become different from a measurement gap used for ordinary measurement. At this time, it is preferable that a gap period which is configured for use in small-cell measurement (second gap period) is a part of a gap period which is configured for use in ordinary measurement (first gap period). This is because when the terminal device 2 switches ordinary measurement and small-cell measurement based on receiving power of the serving cell, the base station device 1 does not know a timing of this switching at the terminal device 2. Therefore, when a configuration is made so that the second gap period which is configured for use in small-cell measurement becomes a part of the first gap period which is configured for use in ordinary measurement and the base station device 1 stops signal transmission to the terminal device 2 in the first gap period which is configured for use in ordinary measurement, it is possible to perform communication in the serving cell regardless of the switching timing at the terminal device 2.

Figure 10:
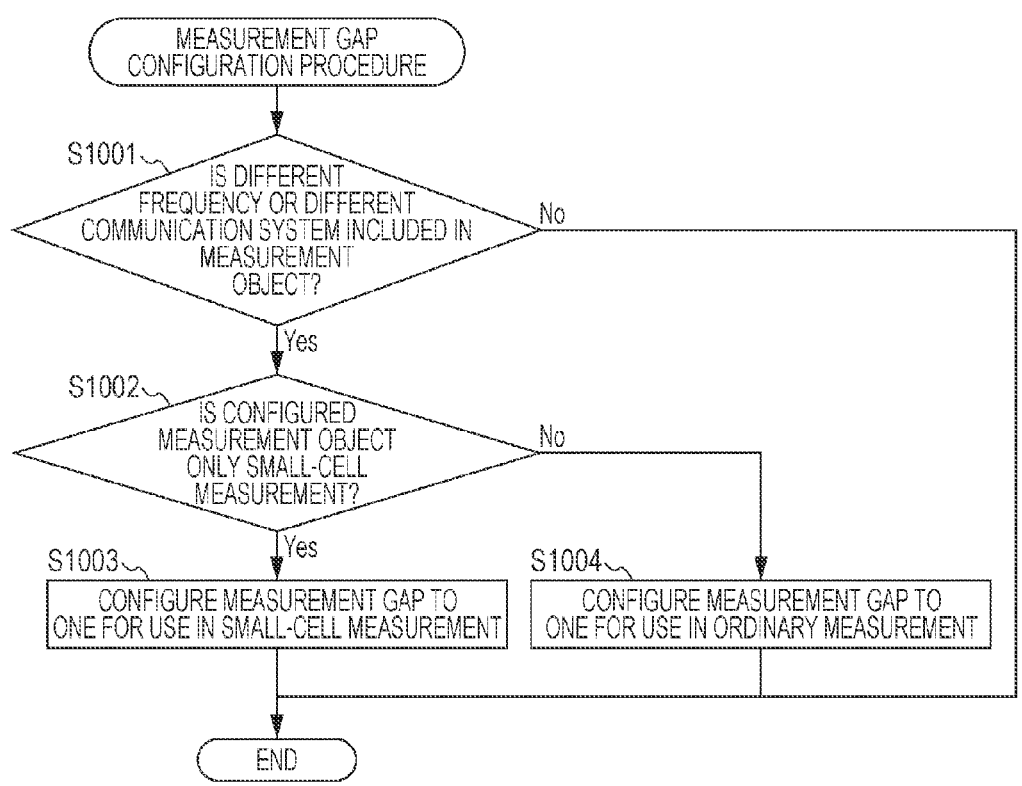
FIG. 10 is a flowchart showing one example of operation of configuring a gap period to stop signal transmission to the terminal device 2 by a base station device 1 in the first embodiment of the present invention.

Next, description will be given for one example of operation for configuring a gap period during which the base station device 1 stops signal transmission to the terminal device 2 by using FIG. 10. As described above, when the terminal device 2 switches ordinary measurement and small-cell measurement based on the receiving power of the serving cell, the base station device 1 does not know a timing of this switching at the terminal device 2. Therefore, the base station device 1 determines whether or not the measurement object which is in a state where measurement is effective (a state where a measurement ID, a measurement object ID and a report configuration ID are linked in one) among measurement objects notified to the terminal device 2 includes a different frequency or a different radio communication technology system (step S1001). When the measurement object does not include a different frequency or a different radio communication technology system (No at step S1001), a measurement gap is not configured. When the measurement object includes a different frequency or a different radio communication technology system (Yes at step S1001), the base station device 1 determines whether or not the measurement object which is in a state where the aforementioned measurement is effective is only for a configuration for use in small-cell measurement (step S1002). When the measurement object is only for a configuration for use in small-cell measurement (Yes at step S1002), the measurement gap is configured to one for use in small-cell measurement (step S1003). When the measurement object includes other than the configuration for use in small-cell measurement (No at step S1002), the measurement gap is configured to one for use in ordinary measurement (step S1004). The base station device 1 which has configured the measurement gap performs scheduling of communication with the terminal device 2 based on the configured measurement gap. With operation above, even when the terminal device 2 switches ordinary measurement and small-cell measurement based on the receiving power of the serving cell, it is possible to perform communication in the serving cell efficiently.

Note that, though an example is shown in the description above that a measurement object for use in small-cell measurement is not measured when the receiving power of the serving cell is less than s-Measure, the measurement object for use in small-cell measurement may be measured regardless of a value of s-Measure or even when s-Measure is not configured. In this case, the base station device 1 and the terminal device 2 need to manage the measurement gap for ordinary measurement and the measurement gap for small-cell measurement independently. However, as described above, when a configuration is made so that the gap period which is configured for use in small-cell measurement becomes a part of the gap period which is configured for use in ordinary measurement and the base station device 1 stops signal transmission to the terminal device 2 in the gap period which is configured for use in ordinary measurement, it is possible to perform communication in the serving cell regardless of the switching timing at the terminal device 2.

Second Embodiment

Description will be given below for a second embodiment of the present invention. Though an example is shown in the first embodiment that a gap configuration for small-cell measurement is included in a measurement object, an example is shown in the present embodiment that a parameter that configures a time for identification of a small cell of a different frequency (Tidentify_inter_smallcell for small-cell identification) to a measurement object by using a conventional gap configuration.

Since communication system (a base station device 1 and a terminal device 2) used in the description of the present embodiment is same as that of FIG. 1 and FIG. 2 in the first embodiment, detailed description thereof will not be repeated.

Subsequently, description will be given for a measurement configuration in the present embodiment by using FIG. 11.

In the same manner as the conventional RRM measurement configuration described above, the measurement configuration in the present embodiment is configured by a measurement ID, a measurement object, a measurement object ID corresponding to the measurement object, a report configuration including a measurement event, and a report configuration ID corresponding to the report configuration. Further, it is defined in the present embodiment so that a configuration of the measurement object is able to include a parameter for a small-cell identification time configuration.

Figure 11:
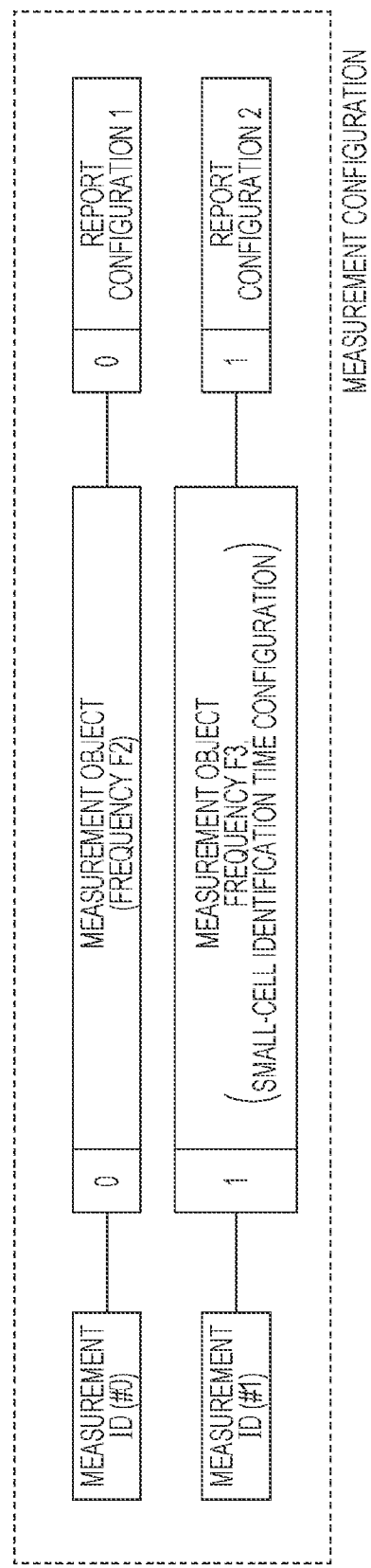
FIG. 11 is a view showing one example of a measurement configuration in a second embodiment of the present invention.

An example in which two measurement objects are defined as the measurement configuration is shown in FIG. 11. The measurement configuration includes report configurations in addition the measurement objects, and a measurement ID is configured to a combination of the aforementioned measurement object and report configuration.

In FIG. 11, a combination of a measurement object (frequency F2) of an identifier 0 and a report configuration 1 of an identifier 0 is specified as a measurement ID #0. In the same manner, a combination of a measurement object (frequency F3, small-cell identification time configuration) of an identifier 1 and a report configuration 2 of an identifier 1 is specified as a measurement ID #1. Moreover, it is set here that the event A1 described above is specified as the measurement event for the report configuration 1 and the event A3 described above is specified as the measurement event for the report configuration 2.

Figure 12:
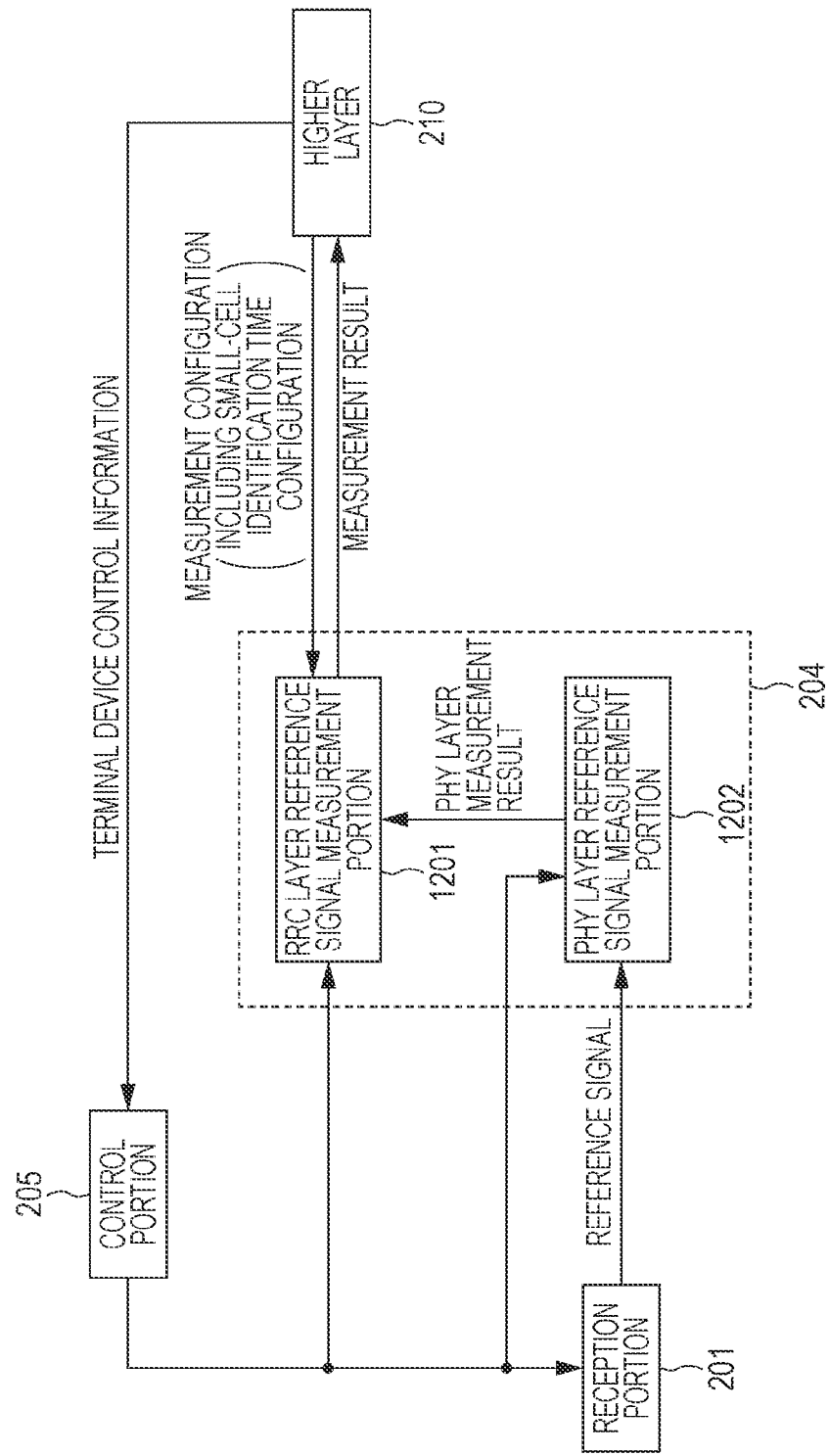
FIG. 12 is a block diagram showing one example of a measurement portion of a terminal device in the second embodiment of the present invention.

Next, description will be given for the measurement portion 204 in the present embodiment by using FIG. 12.

The measurement portion 204 includes an RRC layer reference signal measurement portion 1201 and a PHY layer reference signal measurement portion 1202. The PHY layer reference signal measurement portion 1202 measures RSRP and RSRQ of a reference signal input from the reception portion 201, a channel state and the like to notify the RRC layer reference signal measurement portion 1201. The RRC layer reference signal measurement portion 1201 averages, if necessary, individual measurement results notified from the PHY layer reference signal measurement portion 1202 for the measurement object which is configured by the measurement configuration notified from the higher layer 210 to consider whether or not to be matched with the report configuration, and notifies the measurement result to the higher layer 210. Here, when the measurement object of the measurement configuration notified from the higher layer 210 includes a parameter for a small-cell identification time configuration, the measurement portion 204 considers that this measurement object is the configuration for small-cell measurement.

Here, the terminal device 2, when the parameter for a small-cell identification time configuration is included in the measurement object of the measurement configuration message notified from the base station device 1 in the same manner as the first embodiment, may consider that this measurement object is the configuration for small-cell measurement, and when information of one bit indicating small-cell measurement is included in the measurement object, consider that this measurement object is the configuration for small-cell measurement. Alternatively, information of two bits or more may be included in the measurement object to show that this measurement object is the configuration for small-cell measurement, a configuration for ordinary measurement, or a configuration for taking both of small-cell measurement and ordinary measurement.

Moreover, the parameter for a small-cell identification time configuration is a parameter for calculating time which is configured to identify a small cell, and, for example, may be time specification itself to identify a small cell, may be bit information indicating whether or not time which is notified or prescribed in advance to identify a small cell is applied to the corresponding measurement object, or may be notification of a coefficient m when time for identifying a small cell is time which is obtained by multiplying by an integer number (m times) to a given unit time. Moreover, the aforementioned time for identifying a small cell may be configured so as to be a multiple of the number of frequencies (Nfreq) of the small cell to be measured as time for measuring one frequency.

Subsequently, description will be given for one example of measurement procedure of the terminal device 2 in the communication system of the present embodiment by using a flowchart of FIG. 13.

Figure 13:
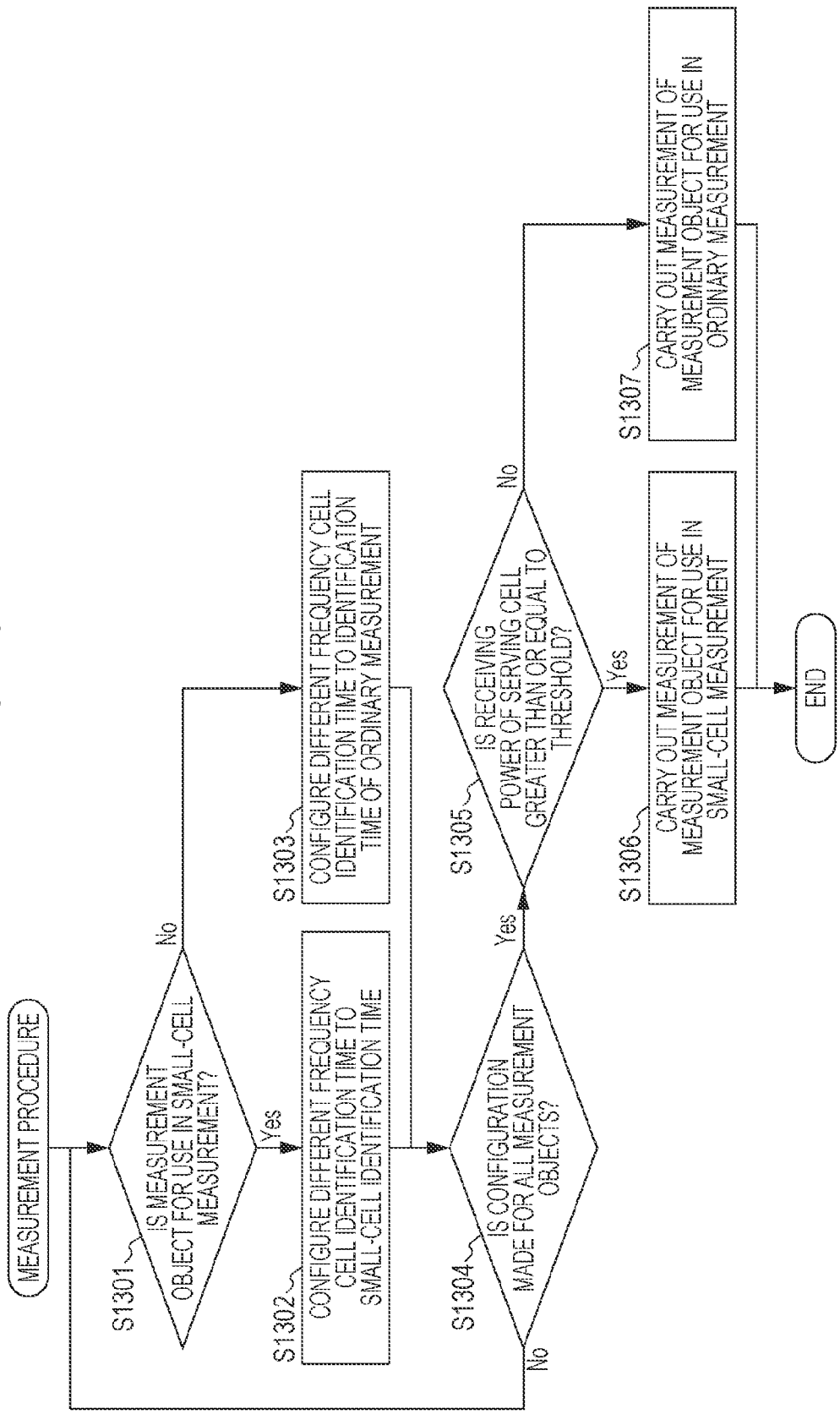
FIG. 13 is a flowchart showing one example of measurement procedure of the terminal device 2 in the second embodiment of the present invention.

In FIG. 13, first, the terminal device 2 receives a measurement configuration message from the base station device 1, and, based on whether or not the parameter for a small-cell identification time configuration described above is included in a measurement object, considers whether or not this measurement object is for use in small-cell measurement (step S1301). When the measurement object is for use in small-cell measurement (Yes at step S1301), a different frequency cell identification time is configured to a small-cell identification time (step S1302), and the flow shifts to step S1304. When the measurement object is for use in ordinary measurement (No at step S1301), the different frequency cell identification time is configured to an identification time for use in ordinary measurement (step S1303), and the flow shifts to step S1304. At step S1304, the terminal device 2 determines whether or not the aforementioned configuration is made for all measurement objects requiring a measurement gap configured to the own device, and when there is a measurement object to which the configuration is not made, the flow shifts to step S1301 to make a configuration of the different frequency cell identification time for a next measurement object. When the aforementioned configuration is made for all the measurement objects requiring a measurement gap configured to the own device at step S1304, the flow shifts to step S1305. The terminal device 2 measures receiving power of a serving cell in which the own device is present and makes comparison with a threshold (s-Measure) at step S1305. When the receiving power of the serving cell is greater than or equal to the threshold (Yes at step S1305), measurement of the measurement object for use in small-cell measurement is carried out (step S1306). When the receiving power of the serving cell is less than the threshold (No at step S1305), measurement of the measurement object for use in ordinary measurement is carried out (step S1307).

Here, description will be given for operation of the terminal device 2 when the small-cell identification time is applied as the different frequency cell identification time. For example, the identification time for use in ordinary measurement is set as Tidentify_inter and the small-cell identification time is set as Tindentify_inter_smallcell. Here, when Tindentify_inter_smallcell is ten times of Tidentify_inter, the terminal device 2 is able to reduce frequency of different frequency measurement for identifying a small cell to one tenth of that of ordinary measurement. That is, even when the conventional gap configuration is applied to the terminal device 2, the terminal device 2 is able to carry out it by classifying the frequency of small-cell measurement of a different frequency and the frequency of ordinary different frequency measurement autonomously without clearly specifying gap configuration for small-cell measurement like in the first embodiment.

As described above, when the parameter for a small-cell identification time configuration is included in the configuration of the measurement object and the terminal device 2 switches small-cell measurement and ordinary measurement based on quality (receiving power) of the serving cell, it becomes possible to apply a different frequency cell identification time suitable for each measurement and to search for a different frequency cell efficiently.

Further, measurement of the measurement object for use in small-cell measurement may not be performed not only when the receiving power of the serving cell is less than the threshold but when a mobility state estimation value (MSE) of the terminal device 2 exceeds a threshold (for example, in the case of middle speed or more or in the case of high speed when the estimation value is represented by low speed, middle speed or high speed). That is, when small-cell measurement itself is not performed when the terminal device 2, even if being connected to a small cell, falls out of the cell immediately (at the time of high-speed movement), it becomes possible to search for a different frequency cell efficiently. The aforementioned threshold of the mobility state estimation value may be configured individually for each measurement object, or may be common in all the measurement objects for use in small-cell measurement. In a case where the threshold is configured for each measurement object, for example, when a cell size of a small cell is different for each frequency, etc., by setting the threshold as "high speed" at the frequency with a large cell size and setting the threshold as "middle speed" at the frequency with a small cell size, it becomes possible to search for a different frequency cell efficiently according to the cell size handled at each frequency.

Moreover, the parameter for a small-cell identification time configuration may be changed according to the mobility state estimation value of the terminal device 2. For example, when the coefficient m described above is used, scaling by the mobility state estimation value may be performed or the coefficient m (mHigh, mMid, mLow) may be notified for each mobility state estimation value (for example, for each of high speed, middle speed and low speed). At this time, when m is 0, small-cell measurement for the corresponding measurement object may not be performed. For example, by setting values of mHigh and mMid to 0, it is possible to cause only the terminal device 2 which moves at low speed to take small-cell measurement, so that it becomes possible to search for a different frequency cell efficiently.

In addition, when carrying out ordinary measurement, it is preferable that a frequency of small-cell measurement is not included in calculation of Tidentify_inter or the like (that is, a frequency of small-cell measurement is not included in Nfreq). Further, to the contrary, when carrying out small-cell measurement, it is preferable that a frequency of ordinary measurement is not included in calculation of Tidentify_inter_smallcell or the like (that is, a frequency of ordinary measurement is not included in Nfreq). Here, when measurement of the frequency of small-cell measurement is configured also to ordinary measurement, this frequency is preferably included in Nfreq of both of them.

Note that, though an example is shown in the description above that a measurement object for use in small-cell measurement is not measured when the receiving power of the serving cell is less than s-Measure, the measurement object for use in small-cell measurement may be measured regardless of a value of s-Measure or even when s-Measure is not configured. In this case as well, since the base station device 1 stops signal transmission to the terminal device 2 in the gap period which is configured for use in ordinary measurement, it is possible to perform communication in the serving cell regardless of whether to be small-cell measurement or ordinary measurement.

Though examples have been shown in the first and second embodiments described above that a gap configuration for small-cell measurement and an identification time configuration are introduced, it is also possible to apply both of them at the same time. That is, the base station device 1 may notify the terminal device 2 of any of the gap configuration for small-cell measurement and the parameter for the small-cell identification time configuration or both of them, and the terminal device 2 may apply time for identifying a small cell of a different frequency (Tindentify_inter_smallcell for small-cell identification) at the time of measuring the measurement object to which the gap configuration for small-cell measurement is applied. When what is notified from the base station device 1 to the terminal device 2 is any of the gap configuration for small-cell measurement and the parameter for the small-cell identification time configuration, for a configuration which is not notified, a given configuration for use in small-cell measurement may be used or a configuration which is derived uniquely from the notified configuration may be used.

Moreover, though description has been given in each embodiment described above regarding the parameter for small-cell identification Tidentify_inter, without limitation thereto, for example, also when configuring a cell measurement time for RSRP or RSRQ measurement of a small cell after cell identification (for example, Tmeasurement_period_inter_FDD or the like) or a small-cell identification time using a different radio communication technology (for example, Tidentify, UTRA_FDD or the like), it may be set so that a value becomes different depending on whether to be small-cell measurement or ordinary measurement.

Though an example is taken in each embodiment described above that the gap configuration for small-cell measurement or the parameter for the cell identification time configuration is included in a measurement object, it may be included not in the measurement object but in a measurement event. In this case, the gap configuration for small-cell measurement or the parameter for the cell identification time configuration is to be applied to one or a plurality of measurement objects which are associated with this measurement event.

Moreover, though description has been given in each embodiment described above that the gap configuration for small-cell measurement and/or the small-cell identification time configuration are/is switched between ordinal measurement and small-cell measurement, a configuration for small-cell measurement may be changed to a configuration for an ordinary configuration at the time of measuring receiving power (RSRP) or reception quality (RSRQ) after small-cell identification. For example, the terminal device 2 performs search of a small cell with low frequency based on the gap configuration for small-cell measurement and/or the small-cell identification time configuration. When a cell is detected, based on the gap configuration for ordinary measurement and the cell measurement time configuration for ordinary measurement, the receiving power or reception quality of the detected cell is measured and reported to the base station device 1. In this manner, by switching the configuration for small-cell measurement to the configuration for ordinary measurement after small-cell identification, it is possible to measure and report the receiving power and the reception quality promptly after small cell detection. At this time, the aforementioned configuration may be switched at a time when one cell is identified with a frequency of a measurement object or may be switched at a time when cells are identified by the number which is configured in advance. Further, when the receiving power or the reception quality of the identified cell is less than a threshold which is configured in advance, a configuration which has been a configuration for ordinary measurement may be returned to the configuration for small-cell measurement.

Moreover, a name of each parameter shown in the embodiments according to the present invention is referred to for convenience of description, and even when a parameter name which is applied actually is different from a parameter name of the present invention, a gist of the invention claimed by the present invention is not affected.

Though description has been given above in detail for one embodiment of this invention with reference to drawings, a specific configuration is not limited to the above and various design change and the like can be made without departing from the subject matter of this invention.

Moreover, the terminal device 2 of the embodiments described above is applicable not only to a portable or movable mobile station device, but also to stationary or unmovable electronic equipment which is installed indoors and outdoors such as, for example, AV equipment, kitchen equipment, cleaning/washing machine, air conditioning equipment, office equipment, automatic vending machine, other domestic equipment, measurement equipment, an in-vehicle device, or the like. The terminal device is also referred to as a user terminal, a mobile station device, a communication terminal, a moving body, a terminal, UE (User Equipment), or an MS (Mobile Station). The base station device is also referred to as a radio base station device, a base station, a radio base station, a fixed station, NB (Node-B), eNB (evolved Node-B) BTS (Base Transceiver Station), or a BS (Base Station).

Further, though description has been given for the base station device 1 and the terminal device 2 of the embodiments by using functional block diagrams for convenience of description, steps of a method or algorithm for realizing functions or a part of these functions of each portion of the base station device 1 and the terminal device 2 may be embodied directly in hardware, in a software module executed by a processor, or in a combination of these two. If being implemented in software, the function may be held or transmitted as one or more commands or codes on a computer readable medium. The computer readable media include both communication media and computer recording media including any medium that facilitates to transfer a computer program from one place to another place.

Then, control of the base station device 1 and the terminal device 2 may be performed by recording one or more commands or codes in a computer readable recording medium and causing a computer system to read the one or more commands or codes recorded in this recording medium for execution. Note that, the "computer system" here is set to include an OS and hardware, such as peripheral equipment.

Operation described in each embodiment of the present invention may be realized by a program. The program which is operated at the base station device 1 and the terminal device 2 related to each embodiment of the present invention is a program which controls a CPU or the like so as to realize the functions of the aforementioned embodiments involved in each embodiment of the present invention (program causing a computer to function). In addition, information handled in these devices is temporarily accumulated in a RAM during processing thereof, and then stored in various ROM or HDD to be read out by the CPU as necessary, for correction and writing. In addition, although the functions of the embodiments described above are realized by executing the program, the functions of each embodiment of the present invention are also realized in some cases by performing processing based on instructions of the program in conjunction with an operating system or other application programs.

Moreover, the "computer readable recording medium" refers to a portable medium including a semiconductor medium (for example, such as RAM or a nonvolatile memory card), an optical recording medium (for example, such as a DVD, an MO, an MD, a CD or a BD), a magnetic recording medium (for example, a magnetic tape or a flexible disk), or a storage device including a disc unit embedded in a computer system. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case.

Moreover, the aforementioned program may be one for realizing a part of the functions described above, and further may be one capable of realizing the functions described above by being combined with a program which has been already recorded in a computer system.

Moreover, each functional block or various features of the base station device 1 and the terminal device 2 used in each of the aforementioned embodiments may be implemented or executed by a general-purpose processor, a digital signal processor (DSP), an application specific or general application integrated circuit (ASIC), a field programmable gate array signal (FPGA), or other programmable logic devices, discrete gates or transistor logic, or a discrete hardware component, which is designed to execute the functions described in the present specification, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit.

The processor may be implemented also as a combination with a computing device. For example, a DSP and a microprocessor, a plurality of microprocessors, a one or more microprocessors connected to a DSP core, or other such configuration are combined. Further, when a technology of making into an integrated circuit superseding the LSI appears due to advancement of a semiconductor technology, the integrated circuit by this technology is also able to be used.

As above, the embodiments of the present invention have been described in detail based on particular specific examples, however, it is clear that a gist and a scope of Claims of the present invention are not limited to these particular specific examples. That is, the description in the present specification aims to give exemplary description and does not give any limitation to the present invention.

INDUSTRIAL APPLICABILITY

The present invention is applicable to a mobile phone, a personal computer, a tablet computer or the like.

DESCRIPTION OF REFERENCE NUMERALS 1 base station device
2 terminal device
101, 201 reception portion
102, 202 demodulation portion
103, 203 decoding portion
104, 205 control portion
105, 207 coding portion
106, 208 modulation portion
107, 209 transmission portion
108 neatwork signal transmission and reception portion
109, 210 higher layer
204 measurement portion
206 random access processing portion
61, 1201 RRC layer reference signal measurement portion
62, 1202 PHY layer reference signal measurement portion

The invention claimed is:

1. A terminal device comprising:
a receiver configured to, programmed to, or configured and programmed to receive a measurement configuration which includes measurement object information, first information, and scaling factor information, the measurement object information indicating a frequency to be monitored, the first information indicating whether the frequency indicated by the measurement object information is configured for a first measurement or for a second measurement, and the scaling factor information being used to scale a cell identification time of a measurement, wherein
a cell identification time of the first measurement being in proportion to a number of frequencies to be monitored with the first measurement, and
a cell identification time of the second measurement is configured based on the scaling factor information and the cell identification time of the second measurement being in proportion to a number of frequencies to be monitored with the second measurement.

2. A base station device comprising:
a transmitter configured to, programmed to, or configured and programmed to transmit a measurement configuration which includes measurement object information, first information, and scaling factor information, the measurement object information indicating a frequency to be monitored, the first information indicating whether the frequency indicated by the measurement object information is configured for a first measurement or for a second measurement, and the scaling factor information being used to scale a cell identification time of a measurement, wherein
a cell identification time of the first measurement being in proportion to a number of frequencies to be monitored with the first measurement, and
a cell identification time of the second measurement is configured based on the scaling factor information and the cell identification time of the second measurement being in proportion to a number of frequencies to be monitored with the second measurement.

3. A radio communication method applied to a terminal device comprising:
receiving a measurement configuration which includes measurement object information, first information, and scaling factor information, the measurement object information indicating a frequency to be monitored, the first information indicating whether the frequency indicated by the measurement object information is configured for a first measurement or for a second measurement, and the scaling factor information being used to scale a cell identification time of a measurement, wherein
a cell identification time of the first measurement being in proportion to a number of frequencies to be monitored with the first measurement, and
a cell identification time of the second measurement is configured based on the scaling factor information and the cell identification time of the second measurement being in proportion to a number of frequencies to be monitored with the second measurement.

4. A radio communication method applied to a base station comprising:
transmitting a measurement configuration which includes measurement object information, first information, and scaling factor information, the measurement object information indicating a frequency to be monitored, the first information indicating whether the frequency indicated by the measurement object information is configured for a first measurement or for a second measurement, and the scaling factor information being used to scale a cell identification time of a measurement, wherein
a cell identification time of the first measurement being in proportion to a number of frequencies to be monitored with the first measurement, and
a cell identification time of the second measurement is configured based on the scaling factor information and the cell identification time of the second measurement being in proportion to a number of frequencies to be monitored with the second measurement.

* * * * *